US012683701B2

(12) United States Patent
Abdelghaffar et al.

(10) Patent No.: US 12,683,701 B2
(45) Date of Patent: Jul. 14, 2026

(54) DELAY PRE-COMPENSATION IN WIRELESS COMMUNICATION SYSTEM

(71) Applicant: QUALCOMM Incorporated, San Diego, CA (US)

(72) Inventors: Muhammad Sayed Khairy Abdelghaffar, San Jose, CA (US); Yu Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 261 days.

(21) Appl. No.: 18/329,499

(22) Filed: Jun. 5, 2023

(65) Prior Publication Data

US 2023/0396347 A1 Dec. 7, 2023

Related U.S. Application Data

(60) Provisional application No. 63/349,857, filed on Jun. 7, 2022, provisional application No. 63/349,540, filed on Jun. 6, 2022.

(51) Int. Cl.
H04B 7/06 (2006.01)
H04B 17/364 (2015.01)
H04L 5/00 (2006.01)

(52) U.S. Cl.
CPC ......... H04B 17/364 (2015.01); H04L 5/0051 (2013.01)

(58) Field of Classification Search
CPC ... H04L 5/0053; H04L 5/0048; H04L 5/0051; H04L 5/0073
See application file for complete search history.

(56) References Cited

U.S. PATENT DOCUMENTS

| | | | |
|---|---|---|---|
| 2018/0048375 A1* | 2/2018 | Guo | H04B 7/0408 |
| 2019/0387441 A1* | 12/2019 | Koskela | H04W 36/302 |
| 2023/0096382 A1* | 3/2023 | Levitsky | H04B 17/336 370/329 |
| 2023/0284235 A1* | 9/2023 | Gao | H04L 5/0094 370/329 |
| 2024/0372664 A1* | 11/2024 | Nilsson | H04L 5/0094 |

OTHER PUBLICATIONS

3GPP: "3rd Generation Partnership Project, Technical Specification Group Radio Access Network, NR, Physical Layer Procedures for Data (Release 19)", 3GPP TS 38.214 V19.1.0, Sep. 2025, pp. 1-351.
ETSI: "5G, NR, NR and NG-RAN Overall Description, Stage-2 (3GPP TS 38.300 version 19.0.0 Release 19)", ETSI TS 138 300 V19.0.0, Oct. 2025, pp. 1-312.
ETSI: "5G, NR, Physical Layer Procedures for Data (3GPP TS 38.214 Version 18.7.0 Release 18)", ETSI TS 138 214 V18.7.0, Jul. 2025, 308 pages.

* cited by examiner

*Primary Examiner* — Romani Ohri
(74) *Attorney, Agent, or Firm* — Loza & Loza, LLP

(57) ABSTRACT

A network entity can provide a plurality of downlink (DL) transmissions using a plurality of distributed transmission and reception points (TRPs) in a multiple-in-multiple-out (MIMO) system. The network entity can obtain delay metrics of the DL transmissions from the UE. The UE can generate the delay metrics based on measurements of DL reference signals from the distributed TRPs. The network entity can pre-compensate the DL transmissions based on the delay metrics.

30 Claims, 18 Drawing Sheets

1300

1302

Receive a delay report including delay metrics of a plurality of transmission and reception points (TRPs) associated with the network entity

1304

Operate the plurality of TRPs to transmit a plurality of multiple-in-multiple-out (MIMO) transmissions, one or more of the MIMO transmissions being delay pre-compensated based on the delay metrics

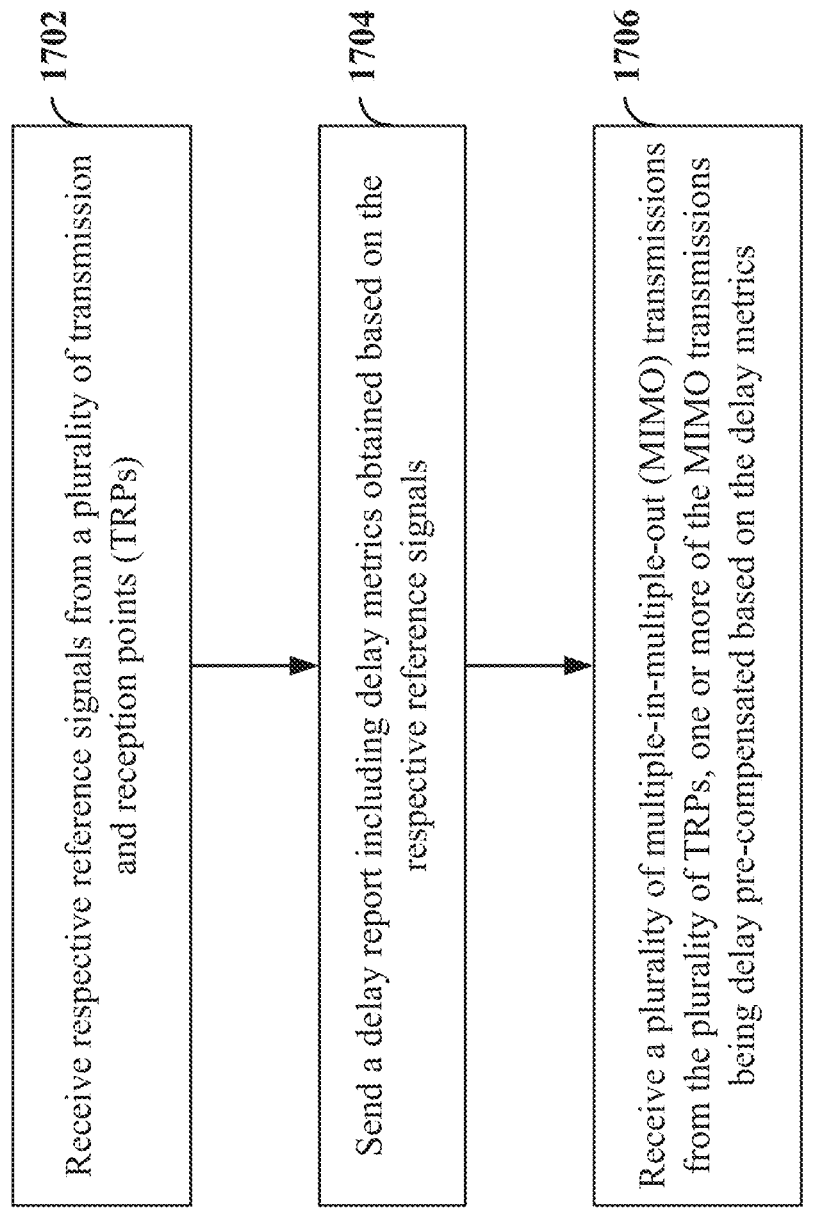

Receive respective reference signals from a plurality of transmission and reception points (TRPs)

1704

Send a delay report including delay metrics obtained based on the respective reference signals

1706

Receive a plurality of multiple-in-multiple-out (MIMO) transmissions from the plurality of TRPs, one or more of the MIMO transmissions being delay pre-compensated based on the delay metrics

DELAY PRE-COMPENSATION IN WIRELESS COMMUNICATION SYSTEM

CROSS-REFERENCE TO RELATED APPLICATIONS

The present application for patent claims priority to and the benefit of U.S. Provisional Patent Application No. 63/349,540 filed in the United States Patent Office on Jun. 6, 2022, and U.S. Provisional Patent Application No. 63/349,857 filed in the United States Patent Office on Jun. 7, 2022. Both applications are hereby expressly incorporated by reference herein as if fully set forth below in its entirety and for all applicable purposes.

TECHNICAL FIELD

The technology discussed below relates generally to wireless communication systems, and more particularly, to network side-based delay pre-compensation in a distributed multiple-in-multiple-out (MIMO) wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements.

A wireless multiple-access communication system can simultaneously support communication for multiple wireless terminals. Each terminal communicates with one or more base stations through transmissions on forward and reverse links. Forward link (or downlink) refers to communication link from the network entities (e.g., base stations) to the terminals, and reverse link (or uplink) refers to communication link from the terminals to the network entities. Communication links may be established through a multiple-in-multiple-out (MIMO) system. A MIMO system employs multiple transmit antennas and multiple receive antennas for data transmissions using one or more MIMO streams. In a distributed MIMO system, multiple network entities (e.g., transmission and reception points (TRPs) and/or remote radio heads (RRH) can cooperate to transmit information to one or more receivers (e.g., mobile devices, terminals) using a MIMO transmission scheme.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to delay pre-compensation of downlink transmissions between a network entity and a user equipment (UE). The network entity can transmit a plurality of downlink (DL) transmissions using a plurality of distributed transmission and reception points (TRPs) in a multiple-in-multiple-out (MIMO) system. The network entity can obtain delay metrics of the DL transmissions from the UE. The UE can generate the delay metrics based on measurements of DL reference signals from the distributed TRPs. The network entity can pre-compensate the DL transmissions based on the delay metrics.

One aspect of the disclosure provides a method for wireless communication at a user equipment (UE) in a wireless communication network. The method includes receiving respective reference signals from a plurality of transmission and reception points (TRPs) associated with a network entity. The method further includes sending a delay report to the network entity, the delay report comprising delay metrics obtained based on the reference signals. The method further includes receiving a plurality of multiple-in-multiple-out (MIMO) transmissions from the plurality of TRPs, one or more of the MIMO transmissions being delay pre-compensated based on the delay metrics.

One aspect of the disclosure provides a UE for a wireless communication network. The UE includes a memory stored with instructions for wireless communication. The UE further includes a processor coupled to the memory. The processor is configured by the instructions to: receive respective reference signals from a plurality of transmission and reception points (TRPs); send a delay report to a network entity, the delay report comprising delay metrics obtained based on the reference signals; and receive a plurality of multiple-in-multiple-out (MIMO) transmissions from the plurality of TRPs, one or more of the MIMO transmissions being delay pre-compensated based on the delay metrics.

One aspect of the disclosure provides a UE for wireless communication. The UE includes means for receiving respective reference signals from a plurality of transmission and reception points (TRPs) associated with a network entity. The UE further includes means for sending a delay report to the network entity, the delay report comprising delay metrics obtained based on the reference signals. The UE further includes means for receiving a plurality of multiple-in-multiple-out (MIMO) transmissions from the plurality of TRPs, one or more of the MIMO transmissions being delay pre-compensated based on the delay metrics.

One aspect of the disclosure provides a computer-readable storage medium stored with code executable by a UE. The code including instructions that cause the UE to: receive respective reference signals from a plurality of transmission and reception points (TRPs) associated with a network entity; send a delay report to the network entity, the delay report comprising delay metrics obtained based on the reference signals; and receive a plurality of multiple-in-multiple-out (MIMO) transmissions from the plurality of TRPs, one or more of the MIMO transmissions being delay pre-compensated based on the delay metrics.

One aspect of the disclosure provides a method for wireless communication at a network entity in a wireless communication network. The method includes receiving a delay report comprising delay metrics of a plurality of transmission and reception points (TRPs) associated with the network entity. The method further includes providing a plurality of multiple-in-multiple-out (MIMO) transmissions via the plurality of TRPs, one or more of the MIMO transmissions being delay pre-compensated based on the delay metrics.

One aspect of the disclosure provides a network entity for wireless communication. The network entity includes a memory stored with instructions for wireless communication and a processor coupled to the memory. The processor is configured by the instructions to receive a delay report comprising delay metrics of a plurality of transmission and reception points (TRPs) associated with the network entity. The processor is further configured by the instructions to provide a plurality of multiple-in-multiple-out (MIMO) transmissions via the plurality of TRPs, one or more of the MIMO transmissions being delay pre-compensated based on the delay metrics.

One aspect of the disclosure provides a network entity for wireless communication. The network entity includes means for receiving a delay report comprising delay metrics of a plurality of transmission and reception points (TRPs) associated with the network entity. The network entity further includes means for providing a plurality of multiple-in-multiple-out (MIMO) transmissions via the plurality of TRPs, one or more of the MIMO transmissions being delay pre-compensated based on the delay metrics.

One aspect of the disclosure provides a computer-readable storage medium stored with code executable by a network entity. The code includes instructions causing the network entity to: receive a delay report comprising delay metrics of a plurality of transmission and reception points (TRPs) associated with the network entity; and provide a plurality of multiple-in-multiple-out (MIMO) transmissions via the plurality of TRPs, one or more of the MIMO transmissions being delay pre-compensated based on the delay metrics.

One aspect of the disclosure provides a method for wireless communication at a user equipment (UE) in a wireless communication network. The method includes: receiving respective reference signals from a plurality of transmission and reception points (TRPs) associated with a network entity; sending a delay report to the network entity, the delay report comprising delay metrics based on the reference signals; and receiving a plurality of multiple-in-multiple-out (MIMO) transmissions from the plurality of TRPs, one or more of the MIMO transmissions being delay pre-compensated to reduce a delay difference between the MIMO transmissions based on the delay metrics.

One aspect of the disclosure provides a user equipment (UE) for a wireless communication network. The UE includes a memory stored with instructions for wireless communication and a processor coupled to the memory. The processor is configured by the instructions to: receive respective reference signals from a plurality of transmission and reception points (TRPs); send a delay report to a network entity, the delay report comprising delay metrics based on the reference signals; and receive a plurality of multiple-in-multiple-out (MIMO) transmissions from the plurality of TRPs, one or more of the MIMO transmissions being delay pre-compensated to reduce a delay difference between the MIMO transmissions based on the delay metrics.

One aspect of the disclosure provides a method for wireless communication at a network entity in a wireless communication network. The method includes: receiving a delay report comprising delay metrics of a plurality of transmission and reception points (TRPs) associated with the network entity; and providing a plurality of multiple-in-multiple-out (MIMO) transmissions via the plurality of TRPs, one or more of the MIMO transmissions being delay pre-compensated to reduce a delay difference between the MIMO transmissions based on the delay metrics.

One aspect of the disclosure provides a network entity for wireless communication. The network entity includes a memory stored with instructions for wireless communication and a processor coupled to the memory. The processor is configured by the instructions to: receive a delay report comprising delay metrics of a plurality of transmission and reception points (TRPs) associated with the network entity; and provide a plurality of multiple-in-multiple-out (MIMO) transmissions via the plurality of TRPs, one or more of the MIMO transmissions being delay pre-compensated to reduce a delay difference between the MIMO transmissions based on the delay metrics.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

BRIEF DESCRIPTION OF THE DRAWINGS

FIG. 17 is a flow chart illustrating another exemplary process for using delay pre-compensation in a distributed MIMO system according to some aspects.

DETAILED DESCRIPTION

Figure 1:
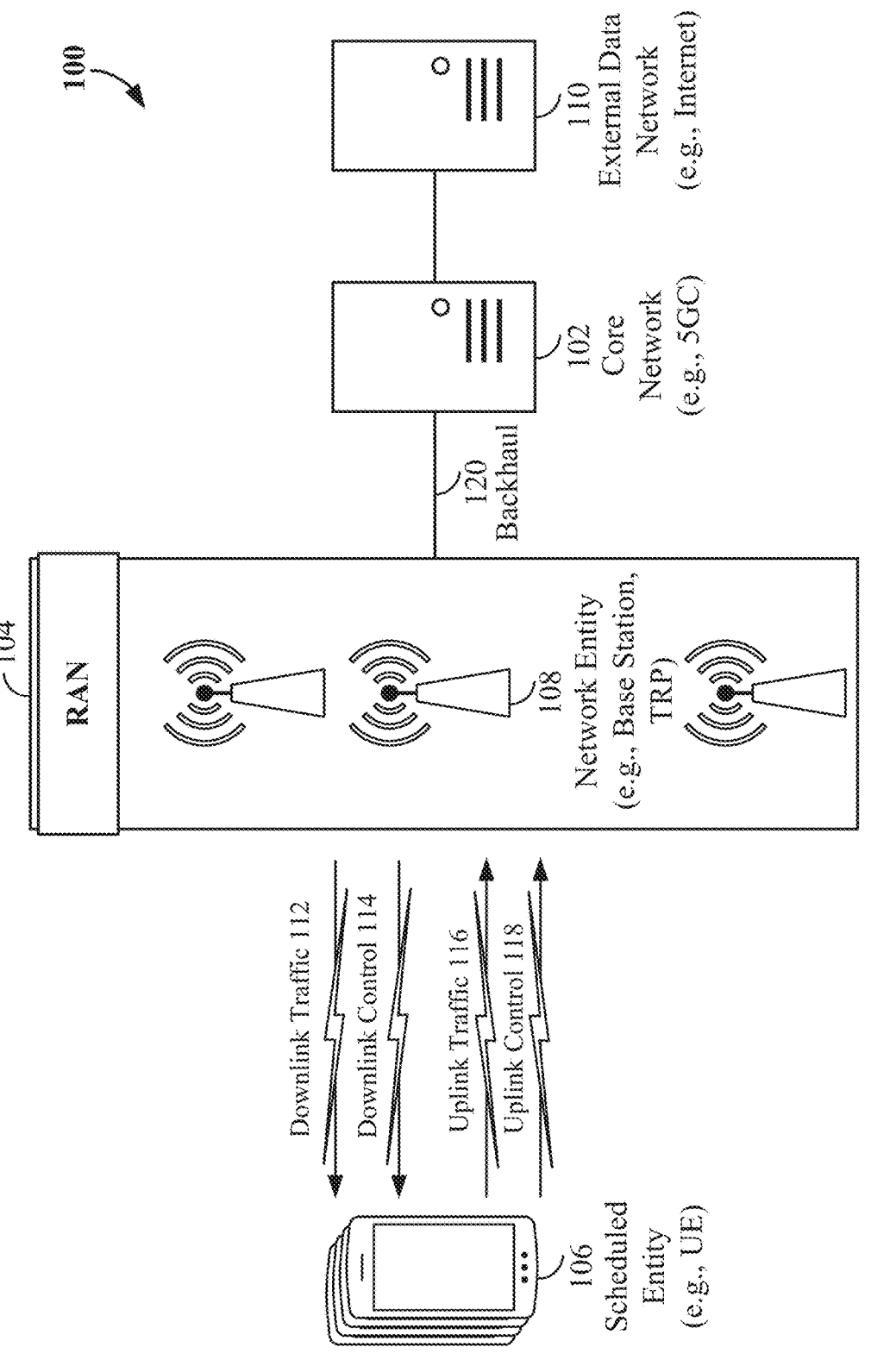
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to delay pre-compensation of downlink transmissions between a network entity and a user equipment (UE). The network entity can transmit a plurality of downlink (DL) transmissions using a plurality of distributed transmission and reception points (TRPs) in a multiple-in-multiple-out (MIMO) system. The network entity can obtain delay metrics of the DL transmissions from the UE. The UE can generate the delay metrics based on measurements of DL reference signals from the distributed TRPs. The network entity can pre-compensate the DL transmissions based on the delay metrics. The pre-compensation of the DL transmission can include advancing or delaying the start time of DL transmission.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G or 5G NR. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities (e.g., base stations 108). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a network entity (e.g., base station 108) to one or more UEs (e.g., UE 106) may be referred to as downlink (DL) transmission. In accordance with certain aspects of the present disclosure, the term downlink may refer to a point-to-multipoint transmission originating at a network entity (described further below; e.g., base station 108). Another way to describe this scheme may be to use the term broadcast channel multiplexing. Transmissions from a UE (e.g., UE 106) to a network entity (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a network entity (e.g., a scheduling entity or a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108. In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, network entities (e.g., base stations 108) may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC, 5G NR). In other examples, the core network 102 may be configured according to a 4G evolved packet core (EPC), or any other suitable standard or configuration.

Figure 2:
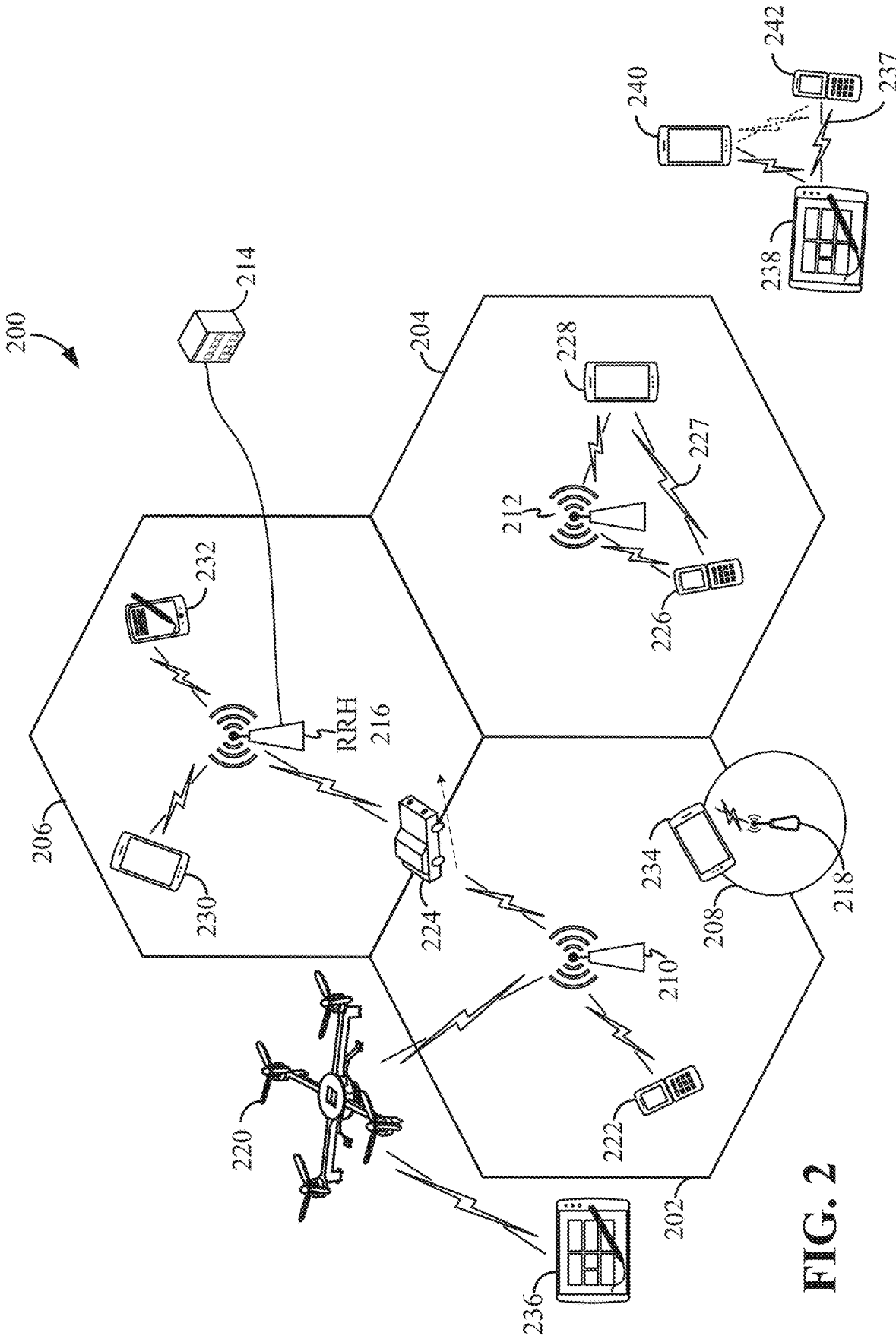
FIG. 2 is a conceptual illustration of an example of a radio access network (RAN) according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from a network entity (e.g., an access point or base station). FIG. 2 illustrates cells 202, 204, 206, and 208, each of which may include one or more sectors (not shown). A sector is a sub-area of a cell. All sectors within one cell can be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, network entities (e.g., base stations 210, 212, and 214/216) may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the network entities (e.g., base stations 210, 212, and 214/216) may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of the licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
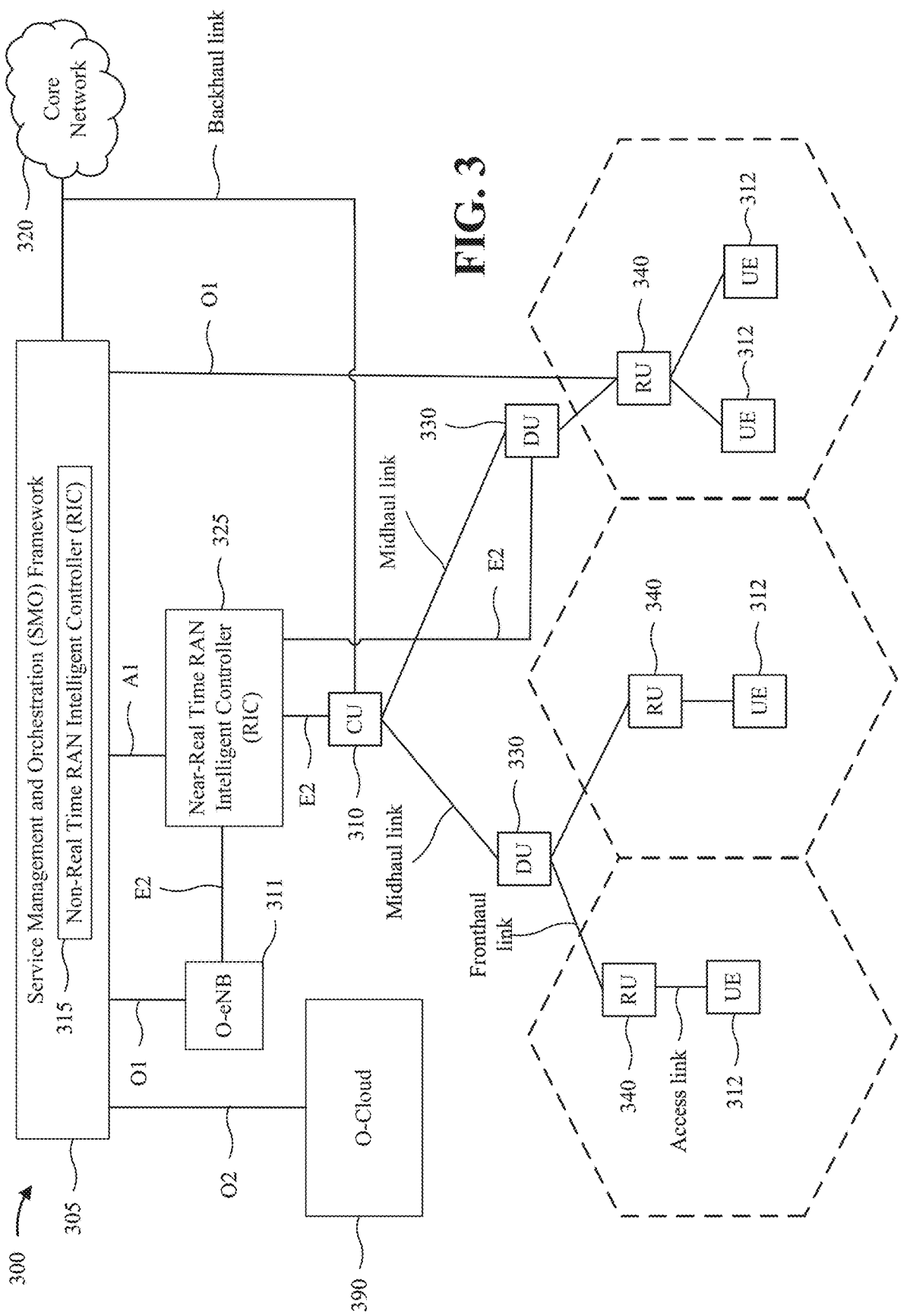
FIG. 3 is a diagram illustrating an exemplary disaggregated base station architecture according to some aspects.

In some aspects, one or more network entities (e.g., base stations, gNBs) illustrated in FIGS. 1 and 2 above can be implemented using a disaggregated architecture. FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 312 via one or more radio frequency (RF) access links. In some implementations, the UE 312 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 312. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via the creation of RAN management policies (such as A1 policies).

In some aspects, the RUs 340 may include TRPs that convert the digital signals received from the DU 330 into analog radio signals that are transmitted over the air to the UE 312. Similarly, the TRPs receive analog radio signals from the UE, convert them into digital signals, and send them back to the DU for further processing.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
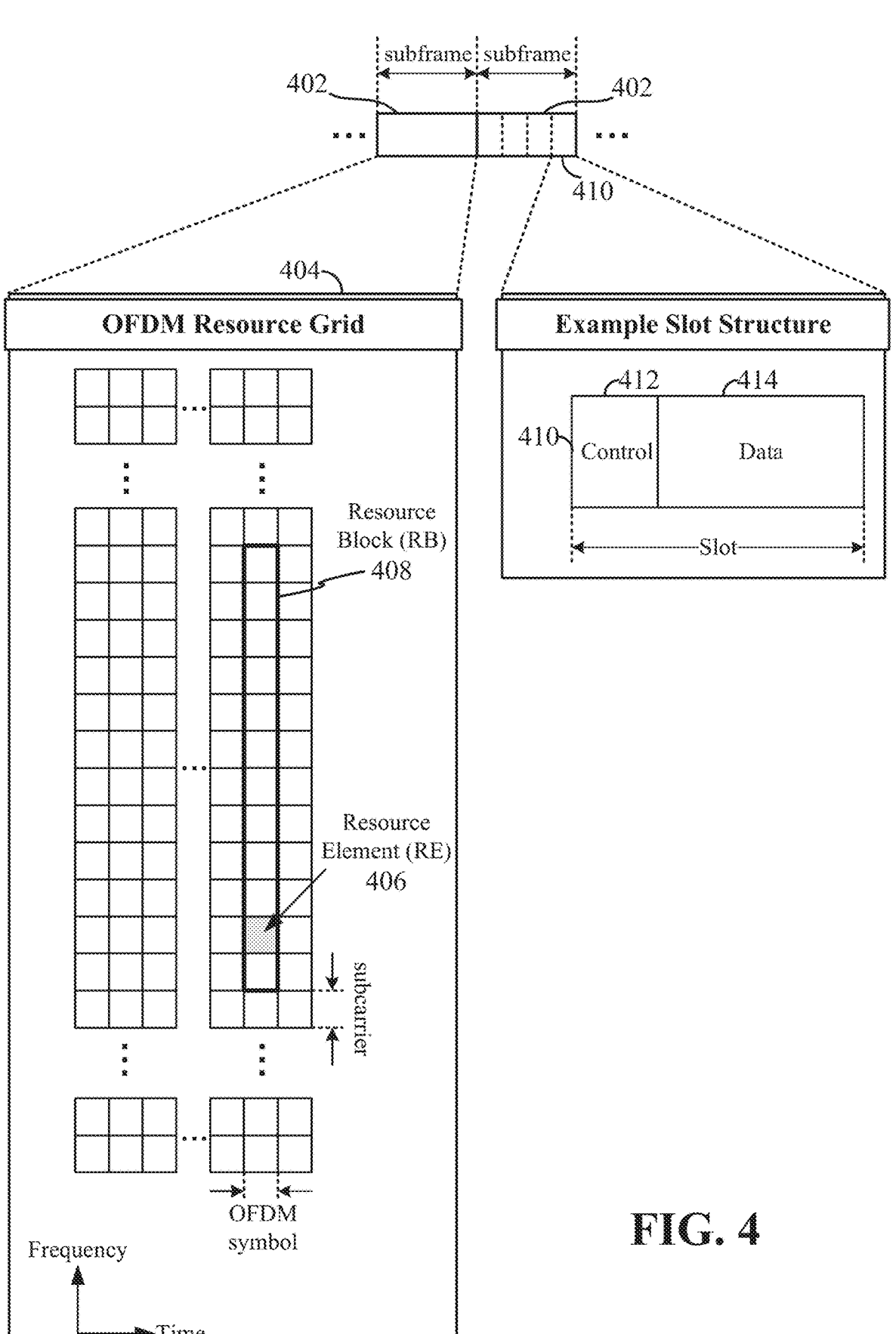
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time—frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. In a slot, the CP length is the duration of a cyclic prefix that is inserted at the beginning of each OFDM symbol. The CP is a guard interval that can be used to mitigate the effects of multipath propagation in wireless communication. In some aspects, the CP is a copy of the end of the OFDM symbol that is inserted at the beginning of the symbol, and the CP serves to mitigate the inter-symbol interference (ISI) caused by the multipath propagation. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity (e.g., base station) may further allocate one or more REs 406 (e.g., in the control region 412 or the data region 414) to carry other DL signals, such as a demodulation reference signal (DMRS); a phase-tracking reference signal (PT-RS) or tracking reference signal (TRS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
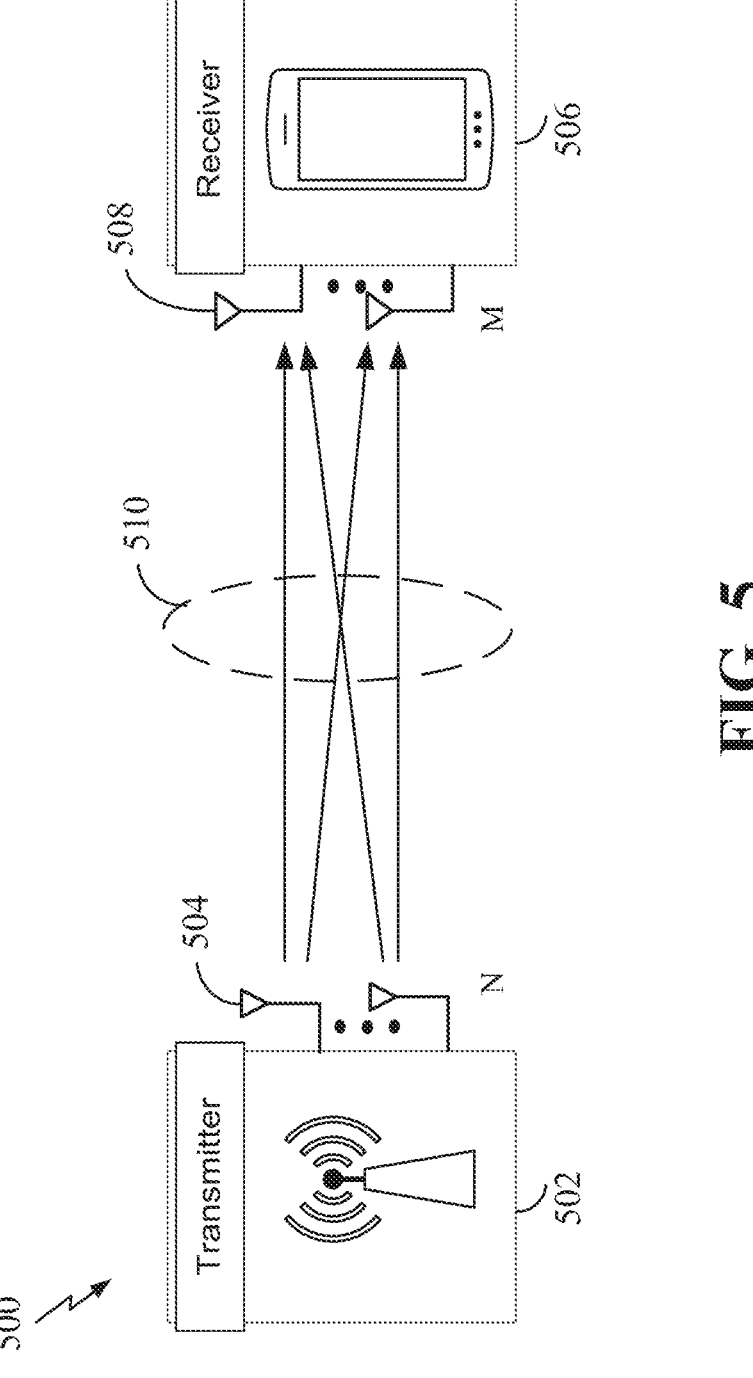
FIG. 5 is a block diagram illustrating a wireless communication system supporting multiple-input multiple-output (MIMO) communication.

In some aspects of the disclosure, the network entity (e.g., base station, CU, DU, TRP, gNB) and/or scheduled entity (e.g., UE) may be configured for beamforming and/or multiple-input multiple-output (MIMO) technology. FIG. 5 illustrates an example of a wireless communication system 500 supporting MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a network entity (e.g., base station 108), a scheduled entity (e.g., UE 106), or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the network entity (e.g., base station) to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the network entity (e.g., base station), may also affect the transmission rank. For example, the rank (and therefore, the number of data streams) assigned to a particular UE on the downlink may be determined based on the rank indicator (RI) transmitted from the UE to the network entity (e.g., base station). The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The network entity (e.g., base station) may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the network entity (e.g., base station) may assign the rank for DL MIMO transmissions based on UL SINR measurements (e.g., based on a Sounding Reference Signal (SRS) transmitted from the UE or other pilot signal). Based on the assigned rank, the base station may then transmit CSI-RS s with separate C-RS sequences for each layer to provide for multi-layer channel estimation. From the CSI-RS, the UE may measure the channel quality across layers and resource blocks and feed back the RI and a channel quality indicator (CQI) that indicates to the network entity (e.g., base station) a modulation and coding scheme (MCS) to use for transmissions to the UE for use in updating the rank and assigning REs for future downlink transmissions.

In the simplest case, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for millimeter wave (mmWave) systems, beamformed signals may be utilized for most downlink channels, including the PDCCH and PDSCH. In addition, broadcast control information, such as the synchronization signal block (SSB), slot format indicator (SFI), and paging information, may be transmitted in a beam-sweeping manner to enable all scheduled entities (UEs) in the coverage area of a TRP (e.g., a gNB, base station, DU) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR sidelink (SL) or V2X, utilizing FR2.

In some examples, spatial division multiplexing may be implemented using a coordinated multi-point (CoMP) network configuration in which transmissions (streams) from multiple transmission and reception points (TRPs) may be simultaneously directed towards a single UE. In a multi-TRP environment providing multi-stream transmission, the multiple TRPs may or may not be collocated (e.g., at the same geographical location and coupled to the same antenna tower or pole). Each of the multiple TRPs may transmit the same or different data to a UE. When transmitting different data from multiple TRPs, a higher throughput may be achieved. When transmitting the same data (with potentially different redundancy versions) from multiple TRPs, transmission reliability may be improved. In some examples, each TRP may utilize the same carrier frequency to communicate with a UE. In other examples, each TRP may utilize a different carrier frequency that may be in the same or different frequency bands (e.g., FR2, FR4-a or FR4-1, FR4, FR5, etc.). For example, each TRP may communicate on different carrier frequencies (referred to as component carriers) in the same frequency band or across frequency bands, and carrier aggregation may be performed at the UE.

Distributed MIMO Systems

Figure 6:
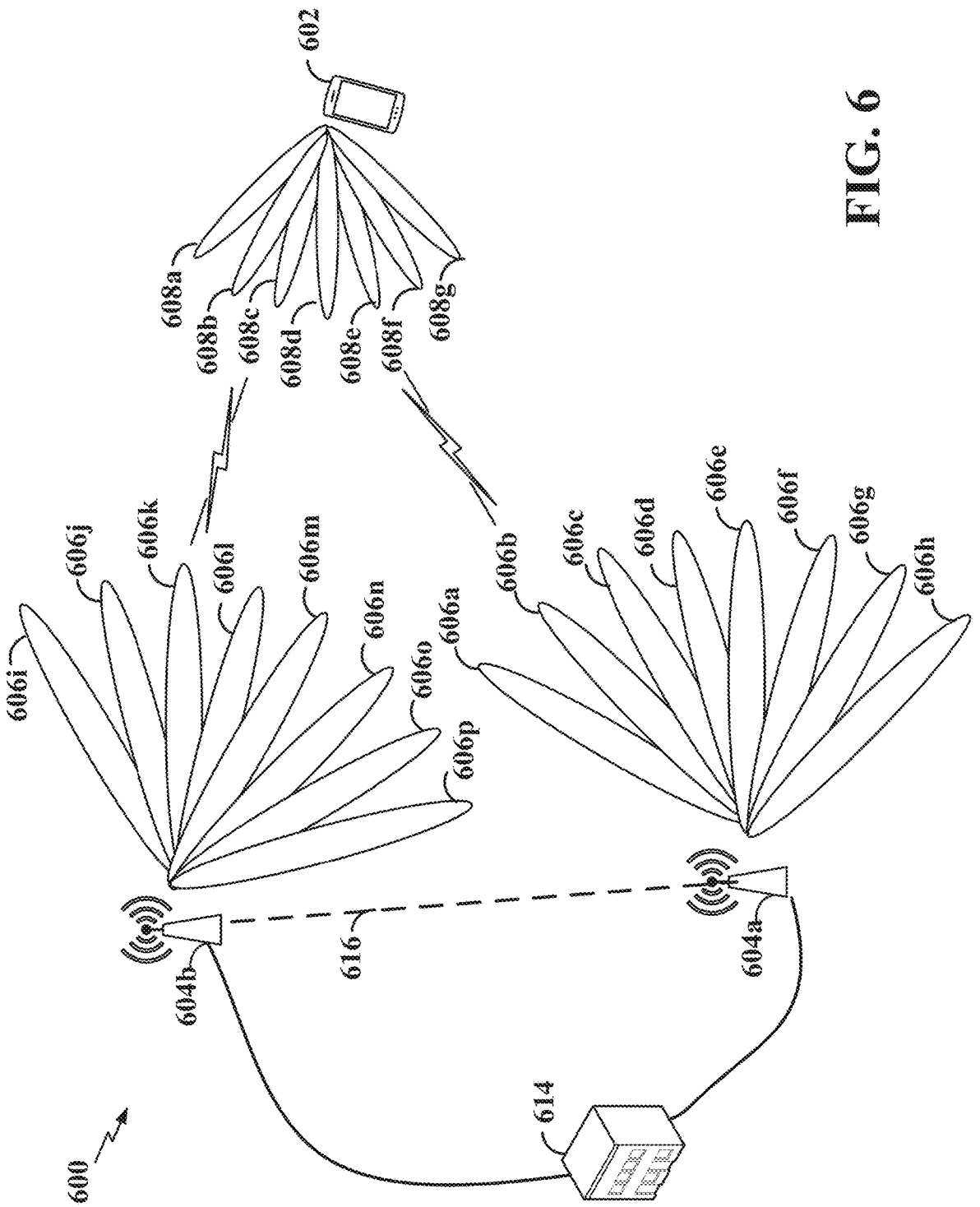
FIG. 6 is a diagram illustrating an example of a distributed MIMO system according to some aspects.

FIG. 6 is a diagram illustrating an exemplary distributed MIMO system 600 according to some aspects. The distributed MIMO system 600 includes a plurality of TRPs and/or RRHs (e.g., two of which TRPs 604a and 604b are illustrated for simplicity). The distributed MIMO system 600 may implement SDM in which transmissions (MIMO streams or transmissions) from the multiple TRPs 604a and 604b may be simultaneously directed towards a single terminal (e.g., UE 602). In such a distributed MIMO environment 600 providing multi-stream transmission (e.g., MIMO transmissions), the multiple TRPs 604a and 604b may be collocated (e.g., at the same geographical location and coupled to the same antenna tower or pole) and/or non-collocated (distributed), the latter being illustrated. In some aspects, the multiple TRPs may form a part of a distributed MIMO system that can include a plurality of TRPs and/or RRHs.

The TRPs 604a and 604b may correspond to macro-cells, small cells, pico cells, femto-cells, remote radio heads, relay nodes, other RAN nodes, or network entities. Coordination among the TRPs 604a and 604b for transmission of multiple streams (e.g., MIMO streams) to the UE 602 may be facilitated by a centralized RAN node or network entity (e.g., a base station or other centralized RAN node (e.g., CU)) or via backhaul signaling between the TRPs 604a and 604b. In the example shown in FIG. 6, the TRPs 604a and 604b may be remote radio heads (RRHs) of a network entity 614 (e.g., base station, gNB, eNB). In other examples, each of the TRPs 604a and 604b may be a separate network entity and coordination occurs over an optional backhaul link 616. The network entity 614 may be any of the base stations or scheduling entities illustrated in FIGS. 1, 2, and/or 3. The UE 602 may be any of the UEs or scheduled entities illustrated in FIGS. 1, 2, and/or 3.

The network entity 614 may generally be capable of communicating with the UE 602 using one or more transmit beams on one or more of the TRPs 604a and 604b, and the UE 602 may further be capable of communicating with the network entity 614 using one or more receive beams. As used herein, the term transmit beam refers to a beam on one of the TRPs 604a and 604b that may be utilized for downlink or uplink communication with the UE 602. In addition, the term receive beam refers to a beam on the UE 602 that may be utilized for downlink or uplink communication with the network entity 614.

In the example shown in FIG. 6, each of the TRPs 604a and 604b is configured to generate a plurality of transmit beams 606a-606h and 606i-606p, respectively, each associated with a different spatial direction. In addition, the UE 602 is configured to generate a plurality of receive beams 608a-608g, each associated with a different spatial direction. In some examples, the TRPs 604a and 604b and UE 602 may each transmit more or less beams distributed in all directions (e.g., 360 degrees) and in three-dimensions. In addition, the transmit beams 606a-606p may include beams of varying beam width. For example, each of the TRPs 604a and 604b may transmit certain signals (e.g., SSB s) on wider beams and other signals (e.g., CSI-RSs, TRS, etc.) on narrower beams. In some examples, the transmit beams 606a-606p on the TRPs 604a and 604b and the receive beams 608a-608g on the UE 602 may be spatially directional mmWave beams (e.g., FR2, FR4-a or FR4-1, FR4, FR5 or other frequency range designation).

The network entity 614 and UE 602 may select one or more transmit beams 606a-606h on TRP 604a, one or more transmit beams 606i-606p on TRP 604b, and one or more receive beams 608a-608g on the UE 602 for communication of uplink and downlink signals therebetween using a beam management procedure. In one example, during initial cell acquisition on each of the TRPs 604a and 604b, the UE 602 may perform a respective P1 beam management procedure to scan the plurality of transmit beams 606a-606h and 606i-606p on each of the TRPs 604a and 604b, respectively, on the plurality of receive beams 608a-608g to select a respective beam pair link (BPL) associated with each of the TRPs 604a and 604b for a respective physical random access channel (PRACH) procedure for initial access. For example, the UE 602 may select a first BPL including one of the transmit beams 606a-606h on the TRP 604a and a corresponding one of the receive beams 608a-608g on the UE 602 and a second BPL including one of the transmit beams 606i-606p on the TRP 604b and a corresponding different one of the receive beams 608a-608g on the UE 602.

For example, periodic SSB beam sweeping may be implemented on each of the TRPs 604a and 604b at certain intervals (e.g., based on the SSB periodicity). Thus, each TRP 604a and 604b may be configured to sweep or transmit an SSB on each of a plurality of wider transmit beams 606a-606h and 606i-606p during the respective beam sweeping interval. The UE 602 may measure the reference signal received power (RSRP) of each of the SSB transmit beams on each of the receive beams of the UE and, for each of the TRPs 604a and 604b, select the transmit and receive beams based on the measured RSRP. In one example, the selected receive beam may be the receive beam on which the highest RSRP is measured and the selected transmit beam may have the highest RSRP as measured on the selected receive beam.

After completing the PRACH procedure, the network entity 614 and UE 602 may perform a P2 beam management procedure for beam refinement at the network entity 614. For example, the network entity 614 may be configured to sweep or transmit a reference signal (e.g., CSI-RS, TRS) on each of a plurality of narrower transmit beams 606a-406h and 406i-406p on each of the TRPs 604a and 604b. For example, each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 602 is configured to scan the plurality of CSI-RS transmit beams 606a-606h and 606i-606p on one or more receive beams 608a-608g. The UE 602 then performs beam measurements (e.g., RSRP, SINR, etc.) of the received CSI-RS s on the one or more receive beams 608a-608g to determine the respective beam quality of each of the CSI-RS transmit beams 606a-606h and 606i-606p as measured on the one or more receive beams 608a-608g. In some examples, the UE 602 may measure the RSRP of each of the narrower CSI-RS transmit beams 606a-606h and 606i-606p from each of the TRPs 604a and 604b on the corresponding receive beams selected during the P1 procedure.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h and 606i-606p on each of the TRPs 604a and 604b on one or more of the receive beams 608a-608g to the network entity 614. The network entity 614 may then select one or more CSI-RS transmit beams on each of the TRPs 604a and 604b on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In addition, when the channel is reciprocal, the transmit and receive beams may be selected using an uplink beam management scheme. In an example, the UE 602 may be configured to sweep or transmit on each of a plurality of receive beams 608a-608g. For example, the UE 602 may transmit an SRS on each beam in the different beam directions. In addition, the network entity 614 may be configured to receive the UL reference signals on the plurality of transmit beams 606a-606h and 606i-606p. The network entity 614 then performs beam measurements (e.g., RSRP, SINR, etc.) of the UL reference signals on each of the transmit beams 606a-606h and 606i-606p to determine the respective beam quality of each of the receive beams 608a-608g as measured on each of the transmit beams 606a-606h and 606i-606p on each of the TRPs 604a and 604b.

The network entity 614 may then select one or more transmit beams on each of the TRPs 604a and 604b on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single transmit beam on each TRP 604a and 604b (e.g., beam 606b and 606k) and a single corresponding receive beam (e.g., beam 608e and 608c) on the UE 602 may form respective single BPLs used for communication between the TRPs 604a and 604b and the UE 602 for multi-stream communication. For example, a first stream of a PDSCH may be communicated on a first BPL formed of transmit beam 606b and receive beam 608e and a second stream of a PDSCH may be communicated on a second BPL formed of transmit beam 606k and receive beam 608c.

In some examples, after connecting to the network entity 614, the network entity 614 may configure the UE 602 to perform SSB and/or CSI-RS beam measurements and provide an L1 measurement report containing beam measurements of SSB and/or CSI-RS transmit beams 606a-606h and 606i-606p. For example, the network entity 614 may configure the UE 602 to perform SSB beam measurements and/or CSI-RS beam measurements for beam management, beam failure detection (BRD), beam failure recovery (BFR), cell reselection, beam tracking (e.g., for a mobile UE 602 and/or network entity 614), or other beam optimization purpose.

To facilitate beamformed multi-stream communication, the network entity 614 may provide the UE with a set of transmission configuration indicator (TCI) states. Each TCI state may include quasi co-location (QCL) information indicating one or more downlink reference signals (e.g., CSI-RS and TRS) from which various radio channel properties of downlink channels or downlink signals (e.g., PDSCH and PDCCH) may be inferred. In various aspects, upon receiving a beam report (e.g., an L1 measurement report) during a P2 procedure or other beam management procedure from the UE 602, the network entity 614 may configure a plurality of TCI states for the UE 602 and provide the configured TCI states to the UE 602. For example, the UE 602 and/or the network entity 614 may manage the configured TCI states. Each TCI state may include QCL information (e.g., QCL-Type A, Type B, Type C, or Type D) between a downlink reference signal, such as an SSB, CSI-RS, or tracking reference signal (TRS), and a downlink signal or downlink channel (e.g., a PDCCH or PDSCH) to be communicated from the network entity 614 to the UE 602. For example, the QCL information may indicate a particular beam on which a PDCCH/PDSCH may be transmitted.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSCPs (e.g., Doppler shift and/or Doppler spread for QCL-TypeB and average delay and/or delay spread for QCL-TypeC) may be inferred. QCL-TypeD may indicate a spatial receive (RX) parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

In addition to L1 measurement reports, the UE 602 can further utilize the beam reference signals to estimate the channel quality of the channel between the network entity (e.g., TRP 604*a* and TRP 604*b*) and the UE 602. For example, the UE 602 may measure the SINR of each received CSI-RS and generate a CSI report based on the measured SINR. The CSI report may include, for example, a channel quality indicator (CQI), rank indicator (RI), pre-coding matrix indicator (PMI), and/or layer indicator (LI). The network entity (e.g., gNB 614) may use the CSI report to select a rank for the UE, along with a precoding matrix and a MCS to use for future downlink transmissions to the UE. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

In some aspects, each TRP (e.g., TRP 604*a* and TRP 604*b*) can transmit a reference signal, associated with a tracking operation at the UE 602. In some aspects, the reference signal can assist the UE with one or more measurements associated with tracking at the UE 602, such as a timing measurement, a frequency measurement, a delay spread, a Doppler estimation, a power delay profile (PDP), and/or the like. Such a signal is referred to herein as a tracking reference signal (TRS) (a type of CSI-RS). In some aspects, the TRS can be transmitted in CSI-RS resources.

In a distributed MIMO system, communication links or channels from different TRPs (e.g., distributed TRPs) to the UE can have different delays (e.g., average delay), for example, due to UE mobility and/or channel characteristics between the UE and the TRPs. In some scenarios, the UE may experience a large delay spread of the combined received MIMO signal, and the delay spread may be larger than the cyclic prefix (CP) duration. Further, this issue can get worse for higher frequency communication that can use larger subcarrier spacing (SCS) and shorter CP. One solution is to increase the CP duration; however, this approach may increase communication overhead and reduce the effective spectral efficiency.

Delay Pre-Compensation

Figure 7:
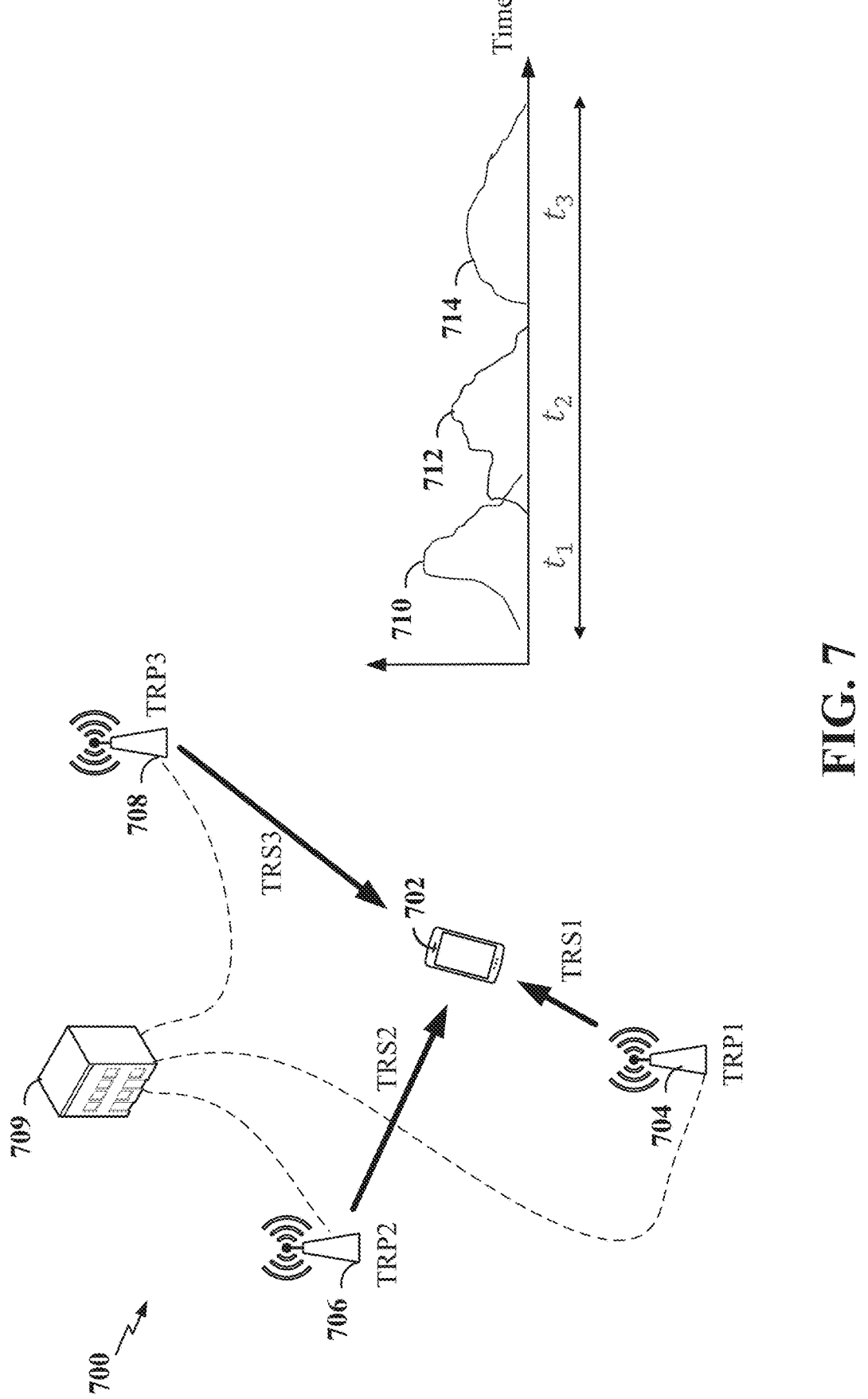
FIG. 7 is a diagram illustrating an example of signal delay spread in a distributed MIMO system according to some aspects.

Aspects of the present disclosure provide a solution to manage delay spread in a distributed MIMO system. In some aspects, a network entity (e.g., a base station) can use collaborative delay pre-compensation across multiple TRPs such that the effective delay spread of the TRPs can be reduced. FIG. 7 is a diagram illustrating an example of DL delay spread in a distributed MIMO system 700. A UE 702 can be in MIMO communication with multiple TRPs (e.g., TRP1 704, TRP2 706, and TRPS 708 are shown for example) associated with a network entity 709. The network entity and associated TRPs may be similar to those described in FIGS. 1-3 and 6. In some cases, the UE can experience different degrees of DL signal delay from the TRPs. For example, the power delay profile (PDP) in FIG. 7 illustrates a first delay spread 710 of a DL transmission from TRP1, a second delay spread 712 of a DL transmission from TRP2, and a third delay spread 714 of a DL transmission from TRP3. A delay spread refers to a time delay between the arrival of the first (earliest) and last (latest) signal components of a wireless signal at the receiver antenna, for example, caused by multipath propagation of the wireless signal. In this example, the combined DL transmissions of the TRPs have a large delay spread (e.g., t1+t2+t3) that may exceed the CP duration of a slot. In some aspects, the delay spread can be referred as a maximum delay spread. When the delay spread is larger than the CP duration or length, inter-symbol interference (ISI) may occur because the CP cannot fully eliminate the effects of the delayed version of the DL signal that arrives after the cyclic prefix. In some aspects, the MIMO transmission of the DL signal from multiple TRPs (e.g., TRP1, TRP2, and TRP3) can be a coherent joint transmission of the same DL signal from the multiple TRPs, or a single-frequency network (SFN) transmission of the same DL signal from multiple TRPs, or a SDM (spatial diversity multiplexing) where each TRP can send a subset of the DL transmission layers. In some aspects, the DL transmission can be from a TRP or a remote radio head (RRH). Then UE 702 can combine the signals from multiple TRPs and uses the combined signal to decode the DL signal.

Figure 8:
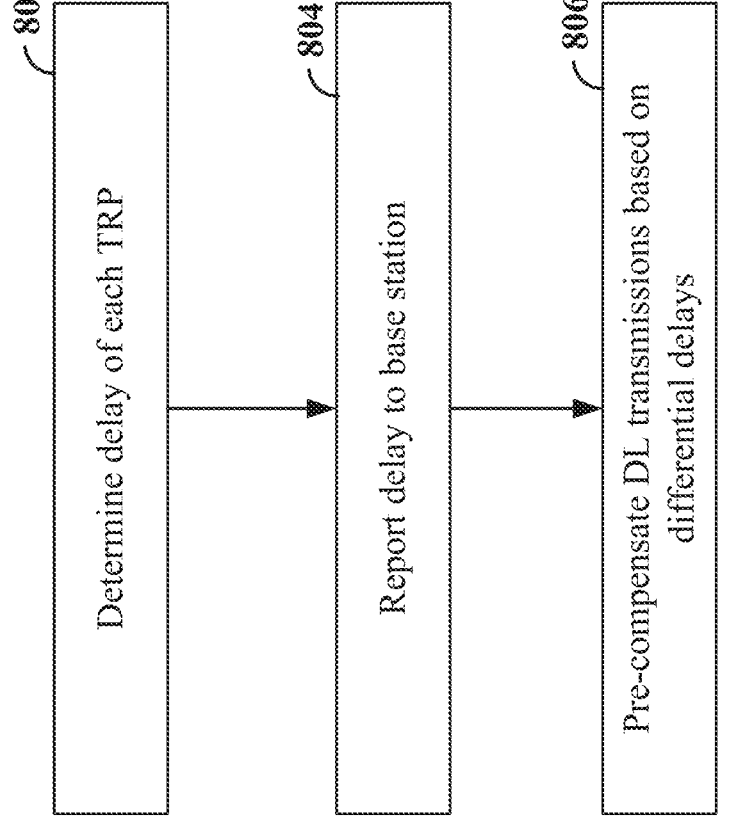
FIG. 8 is a flow chart illustrating a process of reducing delay differences between distributed transmission and reception points (TRPs) according to some aspects.

FIG. 8 is a flow chart illustrating a process 800 of reducing the delay differences between distributed TRPs of a wireless network according to some aspects. In one example, the wireless network may be the MIMO system 700 of FIG. 7 or any wireless network. At 802, the UE 702 can determine the delay (e.g., average delay, delay spread) of each MIMO link from different TRPs. For example, the UE can measure the average delay for a DL transmission from each TRP (e.g., TRP1, TRP2, and TRP3) based on reference signals transmitted by each TRP. In some examples, the reference signals may be SSB, CSI-RS, or TRS. In some aspects, the UE can use the average delay of one TRP (e.g., TRP 704, 706, or 708) as the reference average delay, and determine differential average delays for other TRPs in reference to the reference delay. The differential average delay of a TRP refers to a difference between the average delay of the TRP and the reference average delay of a reference TRP.

At 804, the UE can report the measured delays to the network entity (e.g., base station). In one example, the UE can report the average delays and/or delay spreads for each TRP. In this case, the average delay is an absolute average delay of the TRP that does not depend on another TRP's average delay for reference. Similarly, the average delay spread is an absolute average delay spread of the TRP that does not depend on another TRP's delay spread for reference. In one example, the UE can report a differential average delay of one or more TRPs in reference to the average delay of another TRP (e.g., reference TRP). In some aspects, the UE may transmit the delay information via an uplink channel (e.g., PUCCH and/or a PUSCH) to the network entity.

Figure 9:
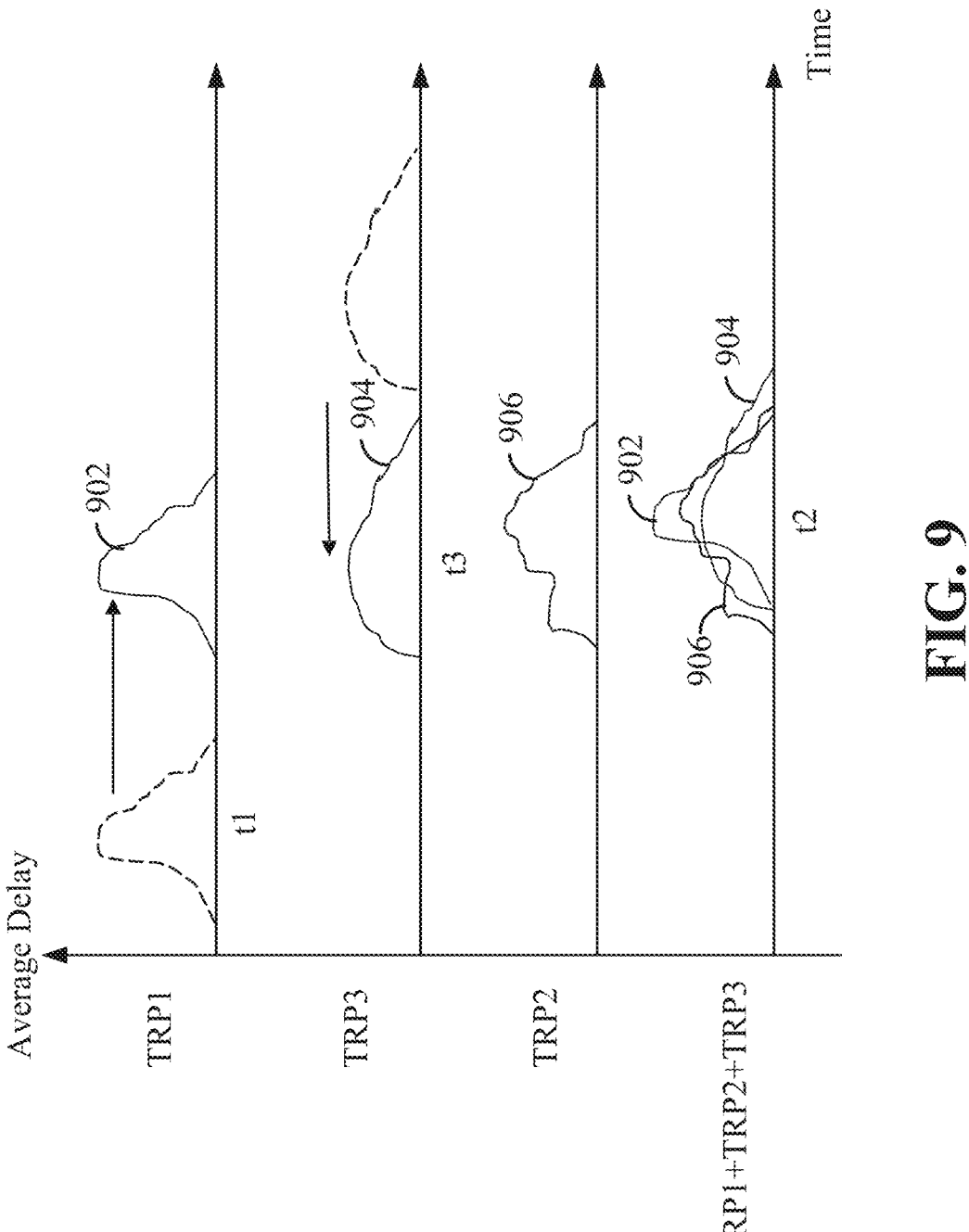
FIG. 9 is a diagram illustrating a process of delay pre-compensation of downlink (DL) transmissions from distributed TRPs according to some aspects.

At 806, the network entity (e.g., base station) can configure one or more TRPs (e.g., TRP1, TRP2, and/or TRP3) to pre-compensate their corresponding DL transmissions (e.g., PDSCH and/or PDCCH) based on the reported delays (e.g., absolute or differential average delays). For example, in FIG. 9, before delay pre-compensation, the average delays of TRP1, TRP2, and TRP3 can be t1, t2, and t3, respectively. In this case, TRP1 can delay its DL transmission 902, and TRP3 can advance its DL transmission 904 such that the resulted average delays of the TRPs become similar in time (e.g., t2). In this case, the average delay of TRP2 can be used as the reference average delay for determining the differential average delays of other TRPs. In other examples, any combinations of delaying or advancing the DL transmissions from one or more TRPs can be used to reduce the difference of the delays (e.g., average delays) between the TRPs.

Figure 10:
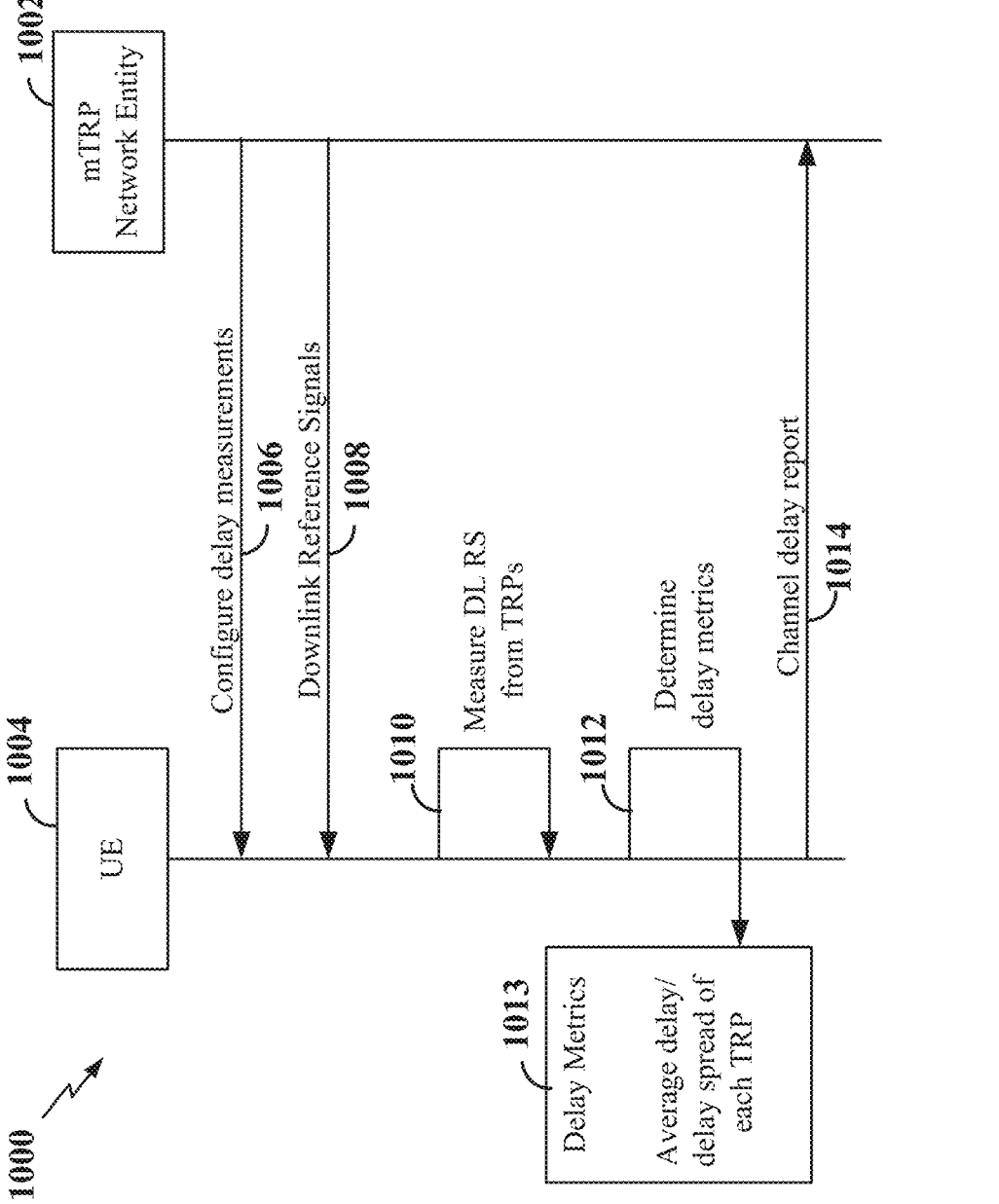
FIG. 10 is a diagram illustrating exemplary signaling between a network entity and a UE for determining delay pre-compensation in a distributed MIMO system according to some aspects.

FIG. 10 is a diagram illustrating exemplary signaling 1000 between a multi-TRP (mTRP) network entity 1002 and a UE 1004 for determining DL delay pre-compensation in a distributed MIMO system. In one example, the mTRP network entity 1002 may correspond, for example, to any of the network entities (e.g., base stations, TRPs) illustrated in FIGS. 1-3, 6, and 7. The UE 1004 may correspond, for example, to any of the UEs or scheduled entities illustrated in FIGS. 1-3, 6, and 7.

At 1006, the mTRP network entity 1002 can configure the UE 1004 to measure and report delay information (e.g., average delay metrics) of multiple TRPs (e.g., TRP1 704, TRP2 706, and TRP3 708 of FIG. 7) associated with the network entity. For example, the network entity can send a message (e.g., an RRC, MAC-CE, or DCI message) that configures the UE to measure the average delay or delay spread of the TRPs based on reference signals (e.g., SSB, CSI-RS, or TRS) transmitted by the TRPs.

At 1008, the network entity 1002 can transmit DL reference signals using multiple TRPs (e.g., TRP1 704, TRP2 706, and TRP3 708 of FIG. 7). For example, the DL reference signals can be SSB, CSI-RS, and/or TRS. For example, the network entity 1002 can transmit the DL reference signals in a PDCCH and/or PDSCH.

At 1010, the UE can measure the DL reference signals received from multiple TRPs. In one aspect, the network entity 1002 can configure the UE to measure and report the average delay for each TRP based on respective DL reference signals from the TRPs. In one aspect, the network entity 1002 can configure the UE to measure and report the respective differential average delays of the TRPs. For example, the network entity (e.g., base station) can be associated with M TRPs (M is a positive integer). One of the M TRPs can be used as a reference TRP for reporting average delay (e.g., absolute average delay). For the other M−1 TRPs, the UE can report the differential average delays of the M−1 TRPs with respect to the average delay of the reference TRP. The network entity can configure or indicate the reference TRP using, for example, an RRC, DCI, or MAC-CE message. In one example, the network entity 1002 can indicate that the reference TRP has the smallest, median, or largest average delay among the TRPs.

In some examples, the TRPs can transmit the reference signals using respective channel measurement resources (e.g., CSI-RS or SSB resources). Channel measurement resources may include time—frequency and/or spatial resources, along with a beam direction, within which a particular reference signal can be transmitted. For example, channel measurement resources may include one or more non-zero-power (NZP) CSI-RS resources, along with one or more CSI interference measurement (CSI-IM) resources. NZP resources can be utilized for channel measurement. CSI-IM resources may include a zero-power (ZP) CSI-RS resource and an NZP CSI-RS resource with similar properties as the NZP CSI-RS resource utilized for channel measurement. In addition, each reference signal may include a number of pilots allocated within the respective channel measurement resource.

At 1012, the UE can determine the delay metrics based on the DL reference signal measurements. For example, the delay metrics 1013 can include the absolute average delay or delay spread for each TRP (e.g., TRP1, TRP2, TRPS of FIG. 7) or differential average delays as described above. The delay metrics can be quantized into a number of bits for reporting.

At 1014, the UE can send a channel delay report, for example, including the delay metrics 1013 of the TRPs. In some aspects, the UE can send the channel delay report using an uplink channel (e.g., PUCCH or PUSCH). In some examples, the channel delay report may be a specific UE report or included in a channel report (e.g., CSI report), scheduling request (SR), or UCI. The network entity 1002 and UE 1004 can each support different types of CSI reports (including L1 measurement reports) and/or different types of measurements (e.g., delay metrics). To distinguish between the different report/measurement types and measurement configurations, the network entity 1002 may configure the UE 1004 with one or more report settings. Each report setting may be associated with a resource setting indicating a configuration of one or more reference signals (e.g., SSB, CSI-RS, or TRS) for use in generating the delay report. In one example, the network entity can use RRC signaling to configure the UE with one or more channel delay report settings.

Figure 11:
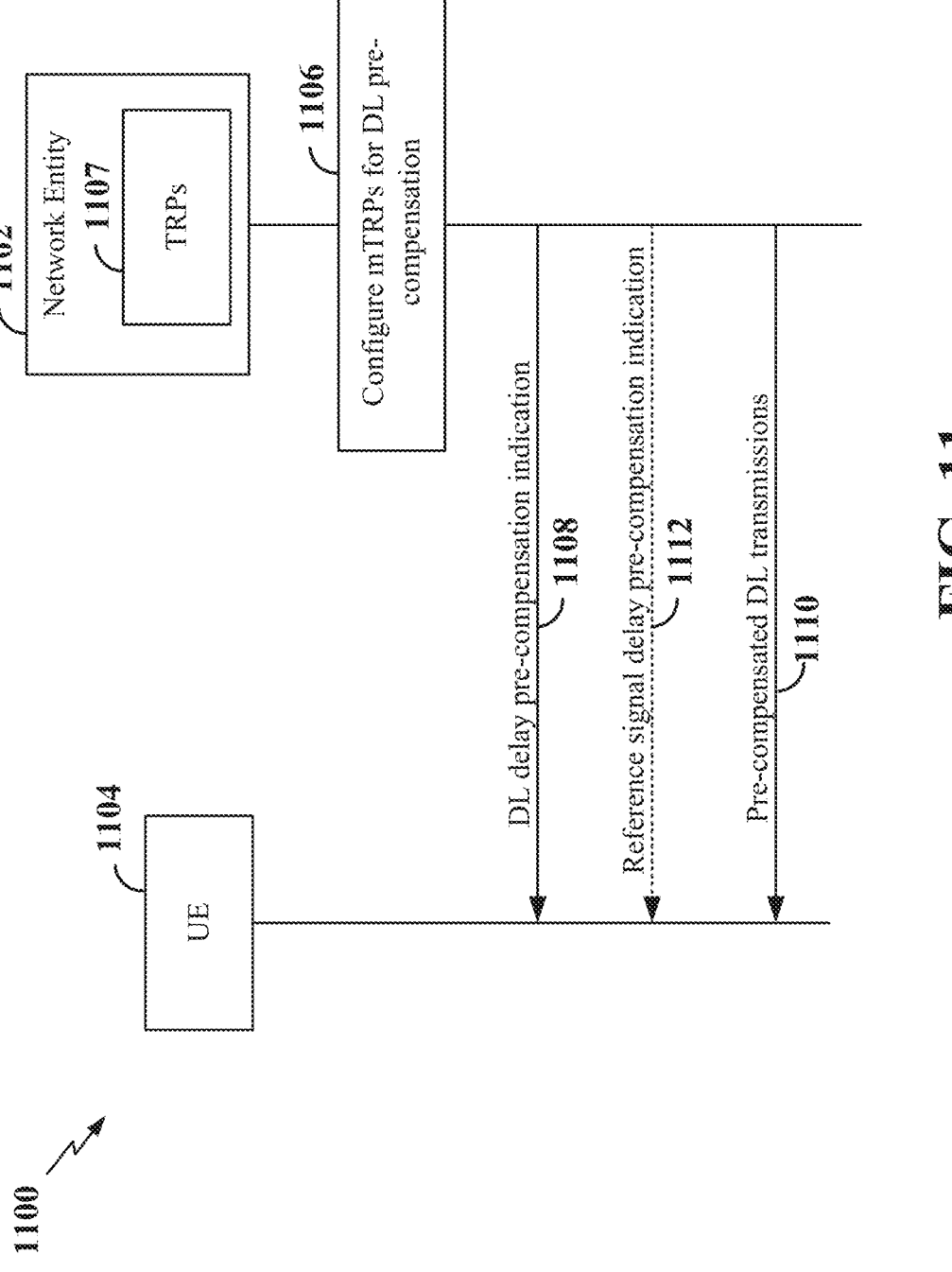
FIG. 11 is a diagram illustrating exemplary signaling between a network entity and a UE for indicating delay pre-compensation in a distributed MIMO system according to some aspects.

FIG. 11 is a diagram illustrating exemplary signaling 1100 between an mTRP network entity 1102 and a UE 1104 for indicating DL delay pre-compensation in a distributed MIMO system. In some aspects, the network entity 1102 can be the same as the network entity 1002 of FIG. 10, and the UE 1104 can be the same as the UE 1004 of FIG. 10. At 1106, the mTRP network entity 1102 (e.g., network entity 709) can configure one or more associated TRPs 1107 (e.g., TRP1, TRP2, and/or TRPS of FIG. 7) to pre-compensate one or more DL transmissions based on the average delay (or delay spread) of the TRPs. For example, the network entity 1102 can determine the DL delay pre-compensation, if needed, for each TRP based on delay metrics (e.g., channel delay report 1014 of FIG. 10) received from the UE 1104. For example, the UE can determine the delay metrics of the TRPs 1107 as described in FIG. 10.

At 1108, the network entity 1102 can send a DL delay pre-compensation indicator or message to the UE. The DL delay pre-compensation indicator can indicate whether any of the DL transmissions from the TRPs 1107 is delay pre-compensated or not to reduce the delay differences between the DL transmission from the TRPs. In one aspect, the network entity can send the DL delay pre-compensation indicator using semi-static or semi-persistent signaling (e.g., RRC configuration) that indicates the DL delay pre-compensation for one or more DL transmissions (e.g., PDCCH and/or PDSCH) from the TRPs. In some aspects, the DL delay pre-compensation indicator can indicate delay pre-compensation per BWP, component carrier, or CORESET.

In one aspect, the network entity can send the DL delay pre-compensation indicator using dynamic signaling (e.g., DCI or MAC-CE) that indicates the DL delay pre-compensation for one or more DL transmissions (e.g., PDCCH and/or PDSCH) from the TRPs. In one aspect, the network entity can send a DCI indication that explicitly indicates the delay pre-compensation, for example, using a bit field containing one or more bits. In one aspect, the network entity can send a DCI indication that implicitly indicates the delay pre-compensation, for example, using a QCL type or TCI state. In one aspect, the DCI indication may be a group DCI that is directed to a group of UEs that can experience the same or similar delay. In one aspect, the network entity can send a MAC-CE (e.g., TCI state MAC-CE activation commands) to indicate the DL delay pre-compensation for one or more DL transmissions.

When delay pre-compensation is used for a DL transmission (e.g., PDSCH or PDCCH), the QCL relation or assumption between the DL reference signal (e.g., CSI-RS or TRS) used for measuring the delay and the delay pre-compensated DL data (PDSCH or PDCCH) may not be valid. In this case, the UE can ignore the average delay and delay spread of the configured QCL type (e.g., QCL Type A) or the corresponding TCI state(s) of the DL data transmission. In some aspects, the network entity can define a new QCL type that does not include average delay and delay spread for the DL data transmission. For example, the new QCL type can include only Doppler spread and Doppler shift. The TCI state from which the UE can obtain the average delay of the pre-compensated link can be predetermined or dynamically (e.g., DCI) indicated by the network entity. Here, the TCI state can indicate the average delay and delay spread based on the combined delays of the DL transmissions of the TRPs.

In some aspects, the network entity (e.g., network entity 709) can delay pre-compensate the DL reference signal (e.g., SSB, CSI-RS, or TRS) in a similar way as the above-described delay pre-compensation of the DL data transmissions (e.g., PDCCH and PDSCH). In this case, the same QCL assumptions will hold between DL data transmissions and DL reference signals. The network entity can indicate whether the DL reference signal (e.g., TRS) is delay pre-compensated or not. For example, the delay pre-compensated reference signal can be an aperiodic TRS that is associated with the cell specific TRS. For example, the network entity can indicate whether the DL reference signal is delay pre-compensated or not using the DL delay pre-compensation indication 1108 or a separate indication 1112.

Figure 12:
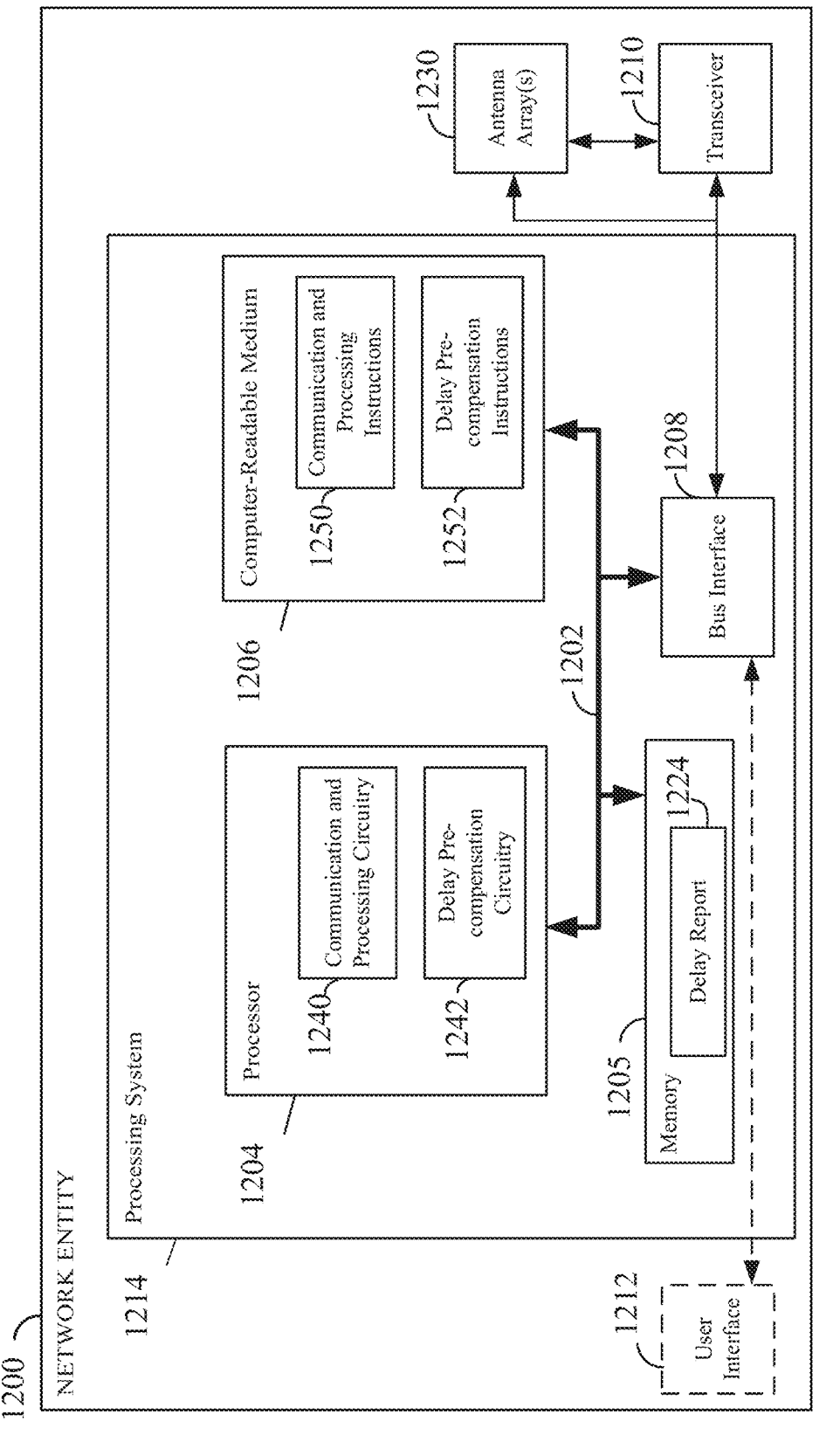
FIG. 12 is a block diagram conceptually illustrating an example of a hardware implementation for a network entity according to some aspects.

FIG. 12 is a block diagram illustrating an example of a hardware implementation for a network entity 1200 employing a processing system 1214. For example, the network entity 1200 may correspond to any of the base stations, TRPs (e.g., combined TRP and base station in an RRH configuration), or other scheduling entities illustrated in any one or more of FIGS. 1, 2, 3, 6, and/or 7.

The network entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1200 may be configured to perform any one or more of the functions described herein. That is, the processor 1204, as utilized in the network entity 1200, may be used to implement any one or more of the processes and procedures described below and illustrated in FIG. 13.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick, touchscreen) may also be provided. Of course, such a user interface 1212 is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions, including, for example, wireless communication in a distributed MIMO system. For example, the circuitry may be configured to implement one or more of the functions described in relation to FIGS. 6-11 and 13.

In some aspects of the disclosure, the processor 1204 may include communication and processing circuitry 1240 configured for various functions, including for example communicating with a network core (e.g., a 5G core network), scheduled entities (e.g., UE), or any other entity, such as, for example, local infrastructure or an entity communicating with the network entity 1200 via the Internet, such as a network provider. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains. In addition, the communication and processing circuitry 1240 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114).

In some examples, the communication and processing circuitry 1240 may be configured to receive and process uplink beamformed signals (e.g., MIMO streams) at a mmWave frequency or a sub-6 GHz frequency via the transceiver 1210 and the antenna array(s) 1230. In addition, the communication and processing circuitry 1240 may be configured to generate and transmit downlink beamformed signals at a mmWave frequency or a sub-6 GHz frequency via the transceiver 1210 and antenna array 1230. For example, the communication and processing circuitry 1240 may be configured for multi-stream communication with the UE entity via spatial division multiplexing (SDM) of the multiple streams on corresponding multiple beam pair links (BPLs) between the UE and respective TRPs of the network entity 1200. For example, the antenna array can correspond to multiple TRPs.

The communication and processing circuitry 1240 may further be configured to transmit a plurality of MIMO streams from a plurality of TRPs of the network entity 1200 using the antenna arrays 1230 and transceiver 1210. Each of the MIMO streams or transmissions may carry a reference signal (e.g., an SSB, CSI-RS, TRS) and/or DL control or user data (PDCCH or PDSCH data). The communication and processing circuitry 1240 may further be configured to receive a delay report 1224 of the TRPs from the UE. The delay report 1224 may further be stored, for example, in the memory 1205. The communication and processing circuitry 1240 may further be configured to transmit delay measurement configuration, delay pre-compensation indication, and pre-compensated DL transmissions to the UE. The communication and processing circuitry 1240 may further be configured to execute communication and processing software 1250 stored on the computer-readable medium 1206 to implement one or more functions described herein.

In some implementations where the communication involves receiving information, the communication and processing circuitry 1240 may obtain information from a component of the network entity 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some aspects of the disclosure, the processor 1204 may include delay pre-compensation circuitry 1242 configured for various functions, for example, functions for delay pre-compensation of DL transmissions in a distributed MIMO system using multiple TRPs. The delay pre-compensation circuitry 1242 may be configured to operate together with the communication and processing circuitry 1240 to generate and transmit a plurality of delay pre-compensated DL transmissions from different TRPs (e.g., distributed TRPs) to the UE. The delay pre-compensation circuitry 1242 can be configured to request the UE to report delay metrics (e.g., absolute average delays or differential average delays) based on DL reference signals (e.g., SSB, CSI-RS, or TRS) transmitted by the TRPs. The delay pre-compensation circuitry 1242 can be configured to receive and process the delay report 1224 from the UE. The delay report 1224 can include delay metrics of the TRPs measured by the UE based on the DL reference signals transmitted by the TRPs. The delay pre-compensation circuitry 1242 can be configured to delay pre-compensate the DL transmissions from the TRPs based on the delay report 1224. For example, delay pre-compensation can include advancing or delaying one or more DL transmissions of the TRPs such that the DL transmissions from the TRPs (e.g., distributed TRPs) arrive at the UE with a time difference that does not exceed the CP duration of a slot. The delay pre-compensation circuitry 1242 can further be configured to execute delay pre-compensation software 1252 stored on the computer-readable medium 1206 to implement one or more functions described herein.

Figure 13:
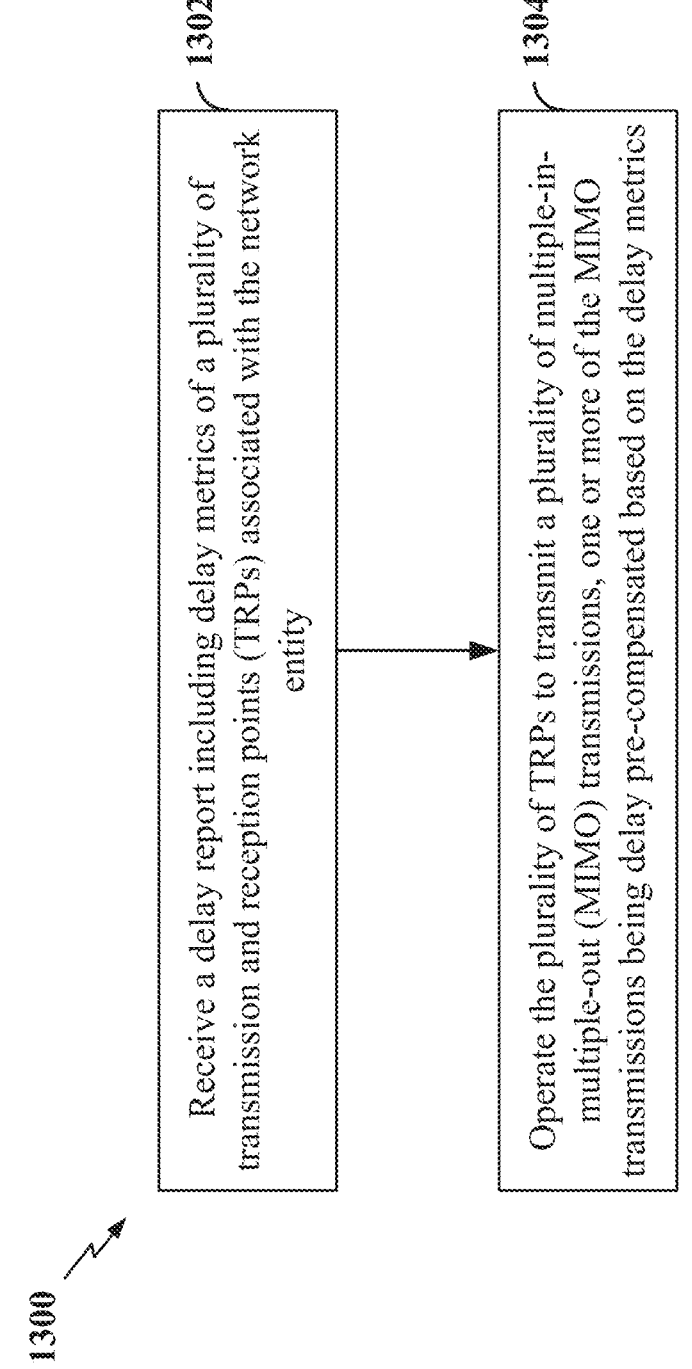
FIG. 13 is a flow chart illustrating an exemplary process for using delay pre-compensation in a distributed MIMO system according to some aspects.

FIG. 13 is a flow chart illustrating an exemplary process 1300 for using delay pre-compensation in a distributed MIMO system according to some aspects. As described below, some or all illustrated features may be omitted in a particular implementation within the scope of the present disclosure, and some illustrated features may not be required for the implementation of all examples. In some examples, the process 1300 may be carried out by the network entity 1200 illustrated in FIG. 12. In some examples, the process 1300 may be carried out by any suitable apparatus or means for carrying out the functions or algorithm described below.

At block 1302, a network entity can receive a delay report including delay metrics of a plurality of transmission and reception points (TRPs) associated with the network entity. In one aspect, the network entity can be a base station or gNB in a distributed MIMO system (e.g., distributed MIMO system 600 or 700). The base station can be configured with a plurality of TRPs (e.g., TRPs 704, 706, and 708 of FIG. 7) to transmit and/or receive MIMO transmissions (e.g., MIMO streams) to/from a UE (e.g., UE 702). In one aspect, the communication and processing circuitry 1240 can provide a means to receive the delay report from the UE, for example, using the transceiver 1210 and antenna array 1230. For example, the network entity can receive a UE report (e.g., UE report or CSI report) that includes the delay metrics of a plurality of TRPs.

In some aspects, the delay metrics can include a plurality of average delays respectively corresponding to the plurality of TRPs. The delay metrics can include the average delay information for each TRP. In some aspects, the delay metrics can include a plurality of differential average delays, and each differential average delay can indicate a delay difference between two of the plurality of TRPs.

At block 1304, the network entity can provide a plurality of MIMO transmissions to the UE. For example, the network entity can operate the plurality of TRPs to transmit a plurality of MIMO transmissions (e.g., PDCCH or PDSCH using transmissions) to the UE. One or more of the MIMO transmissions (e.g., DL transmissions) can be delay pre-compensated based on the delay metrics or delay report. The delay pre-compensation circuitry 1242 can provide a means to delay or advance the transmit timing of one or more of the MIMO transmissions. The communication and processing circuitry 1240 can provide a means to transmit the plurality of MIMO transmissions using a plurality of TRPs.

Figure 14:
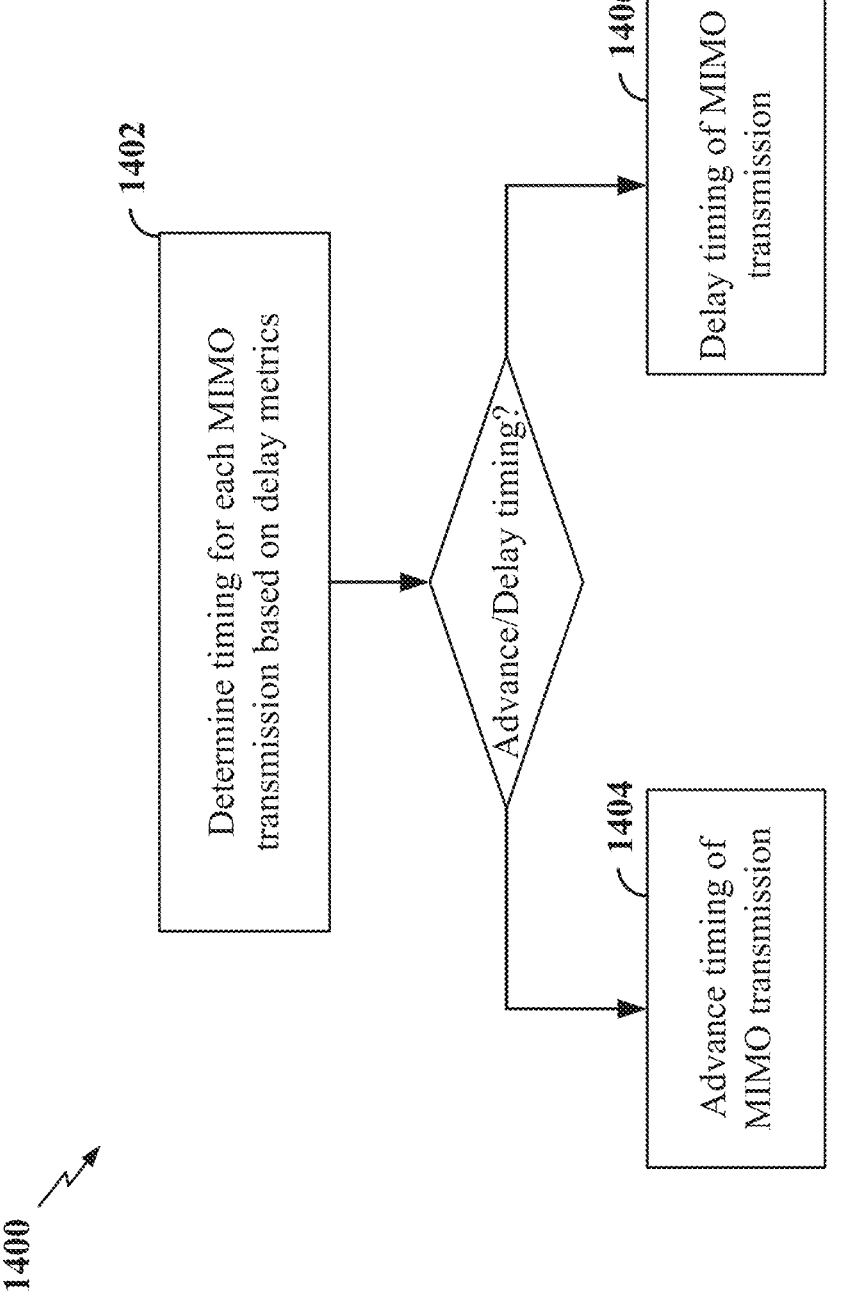
FIG. 14 is a flow chart illustrating an exemplary process for providing a plurality of MIMO transmissions according to some aspects.
Figure 15:
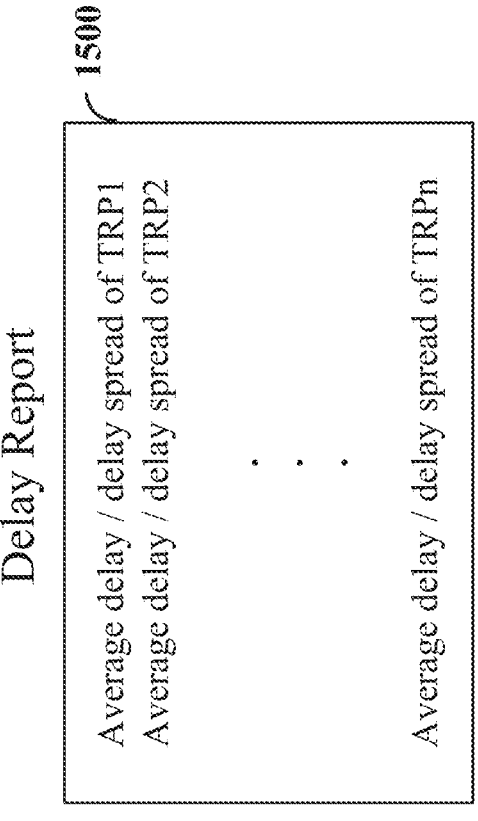
FIG. 15 is diagram conceptually illustrating an example of a delay report according to some aspects.

FIG. 14 is a flow chart illustrating an exemplary process 1400 for providing a plurality of MIMO transmissions according to some aspects. At block 1402, the network entity can determine the timing for each of the plurality of MIMO transmissions based on the delay metrics of the MIMO transmissions. For example, a delay report 1500 (see FIG. 15) received from a UE can provide the delay metrics (e.g., the average delay and/or delay spread of a plurality of TRPs). The delays can be absolute or differential delays. In one example, the delay pre-compensation circuitry 1242 can provide a means to determine the timing of each MIMO transmission.

At 1404, the network entity can advance the timing of a MIMO transmission if the delay metrics indicate that the delay (e.g., average delay or delay spread) of the MIMO transmission is larger than a default timing. Advancing the timing can reduce the latency of the MIMO transmission. At 1404, the network entity can delay the timing of a MIMO transmission if the delay metrics indicate that the delay (e.g., average delay or delay spread) of the MIMO transmission is smaller than a default timing. Delaying the timing can increase the latency of the MIMO transmission.

In some aspects, the plurality of MIMO transmissions can include a first MIMO transmission and a second MIMO transmission, and a timing of the first MIMO transmission is advanced relative to a default/reference timing and a timing of the second MIMO transmission is delayed relative to the default timing. In some aspects, a delay pre-compensated MIMO transmission can include a delay pre-compensated reference signal (e.g., TRS, CSI-RS) and/or a delay pre-compensated DL control (PDCCH) or DL data (PDCCH) transmission.

In some aspects, the network entity can send a delay pre-compensation indication (e.g., DL delay pre-compensation indication 1108 of FIG. 11) to the UE to indicate which one(s) of the MIMO transmissions is/are delay pre-compensated. In some aspects, the delay pre-compensation circuitry 1242 can provide a means to prepare the delay pre-compensation indication that includes timing delay or advance information or indication for each MIMO transmission or TRP. The communication and processing circuitry 1240 can provide a means to send the delay pre-compensation indication to the UE. In some aspects, the delay pre-compensation indication can indicate a transmission configuration indicator (TCI) state for receiving the one or more delay pre-compensated MIMO transmissions.

In some aspects, the network entity can send control information to the UE, and the control information requests or configures the UE to report the delay metrics of the plurality of TRPs. In some aspects, the communication and the processing circuitry 1240 can provide a means to send the control information (e.g., RRC, DCI, MAC-CE message) to the UE. In some aspects, the control information can request the UE to report absolute or differential average delays of the plurality of TRPs.

In one configuration, the network entity 1200 for wireless communication includes means for using delay pre-compensation in a distributed MIMO system. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 2, 3, 6, 7, 10, and/or 11, and utilizing, for example, the processes and/or algorithms described herein in relation to FIGS. 6-11 and/or 13-15.

Figure 16:
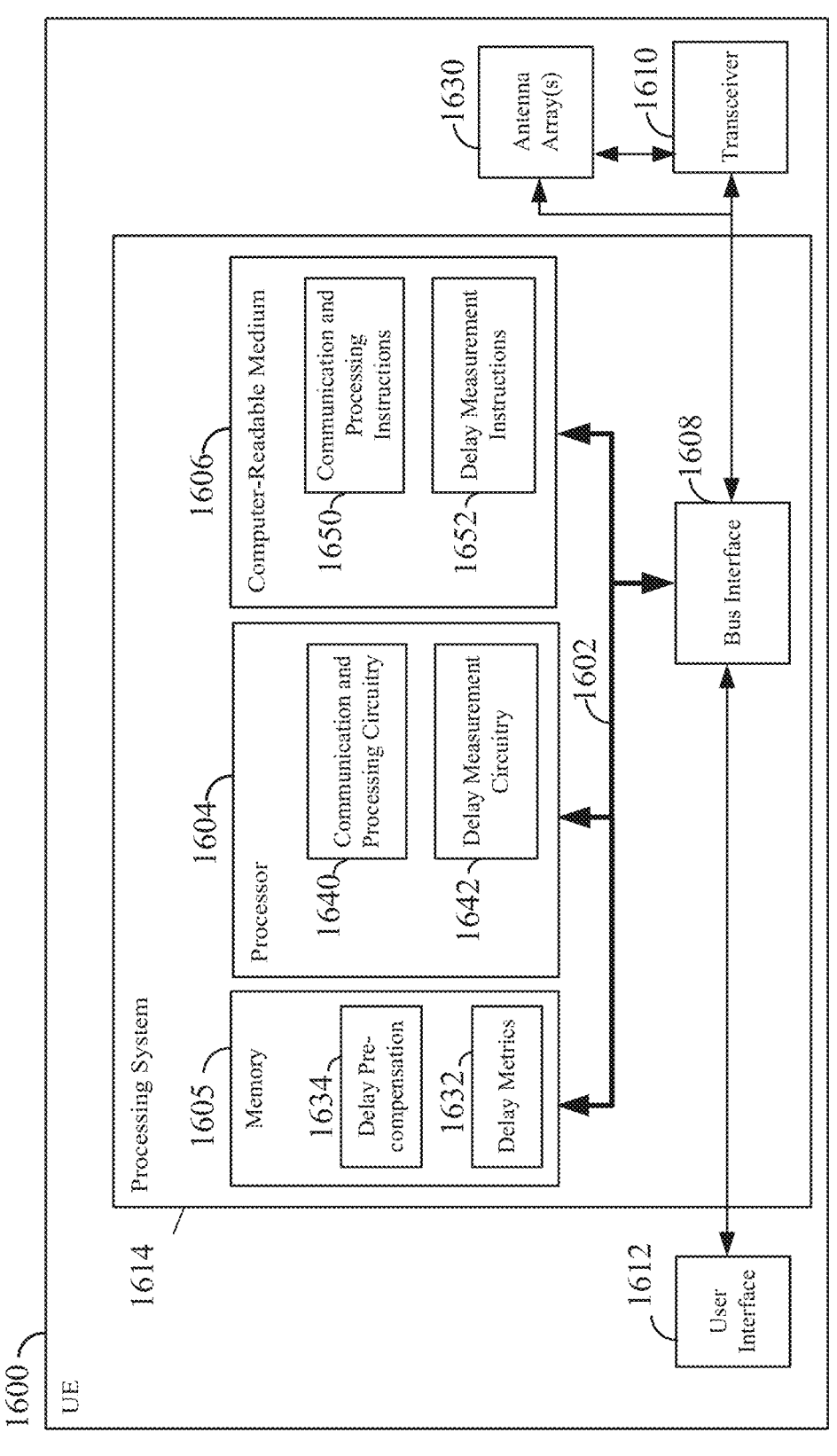
FIG. 16 is a block diagram conceptually illustrating an example of a hardware implementation for a scheduled entity according to some aspects of the disclosure.

FIG. 14 16 a conceptual diagram illustrating an example of a hardware implementation for an exemplary UE 1600 employing a processing system 1614. In accordance with various aspects of the disclosure, an element, or any portion of an element, or any combination of elements may be implemented with a processing system 1614 that includes one or more processors 1604. For example, the UE 1600 may be any of the UEs or scheduled entities as illustrated in any one or more of FIGS. 1, 2, 3, 6, 7, 10, and/or 11.

The processing system 1614 may be substantially the same as the processing system 1214 illustrated in FIG. 12, including a bus interface 1608, a bus 1602, memory 1605, a processor 1604, and a computer-readable medium 1606. Furthermore, the UE 1600 may include a user interface 1612, a transceiver 1610, and antenna array(s) 1630 substantially similar to those described above in FIG. 12. That is, the processor 1604, as utilized in a UE 1600, may be used to implement any one or more of the processes described and illustrated in FIGS. 6-11 and 15.

In some aspects of the disclosure, the processor 1604 may include communication and processing circuitry 1640 configured for various functions, including for example communicating with a network entity (e.g., a base station with multiple distributed TRPs). In some examples, the communication and processing circuitry 1640 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1640 may include one or more transmit/receive chains. In addition, the communication and processing circuitry 1640 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114, and TRS1, TRS2, TRS3 of FIG. 7).

In some examples, the communication and processing circuitry 1640 may be configured to receive and transmit beamformed signals (e.g., MIMO streams) at a mmWave frequency or a sub-6 GHz frequency via the transceiver 1610 and the antenna array(s) 1630. For example, the communication and processing circuitry 1640 may be configured for multi-stream communication with a network entity (e.g., base station) via spatial division multiplexing (SDM) of the multiple streams on corresponding multiple beam pair links (BPLs) between the UE and respective TRPs of the network entity.

The communication and processing circuitry 1640 may further be configured to receive a plurality of MIMO transmissions (e.g., MIMO streams) from a plurality of TRPs of the network entity. Each of the MIMO transmissions may carry a reference signal (e.g., an SSB, CSI-RS, TRS) and/or DL data (PDCCH or PDSCH data). The communication and processing circuitry 1640 may further be configured to transmit a delay report to the network entity. The delay report may include delay metrics (e.g., delay metrics 1632) of the TRPs measured by the UE. The UE can store the delay metrics in the memory 1605. The communication and processing circuitry 1640 may further be configured to execute communication and processing software 1650 stored on the computer-readable medium 1606 to implement one or more functions described herein.

In some aspects of the disclosure, the processor 1604 may include delay measurement circuitry 1642 configured for various functions, for example, delay measurement of DL transmissions from multiple TRPs. For example, the delay measurement circuitry 1642 can be configured to measure the delay metrics (e.g., average delay and/or delay spread) of DL transmissions from each TRP of the base station. The delay measurement circuitry 1642 can be configured to measure the delay based on DL reference signals, for example, SSB, CSI-RS, and TRS transmitted by the TRPs. The delay measurement circuitry 1642 may further be configured to execute delay measurement software 1652 stored on the computer-readable medium 1606 to implement one or more functions described herein. In some aspects, the delay measurement circuitry 1642 can be configured to measure the absolute or differential average delays of the TRPs.

FIG. 17 is a flow chart illustrating an exemplary process 1700 for using delay pre-compensation in a distributed MIMO system according to some aspects. As described below, some or all illustrated features may be omitted in a particular implementation within the scope of the present disclosure, and some illustrated features may not be required for the implementation of all examples. In some examples, the process 1700 may be carried out by the UE 1600 illustrated in FIG. 16. In some examples, the process 1700 may be carried out by any suitable apparatus or means for carrying out the functions or algorithm described below.

At block 1702, the UE can receive respective reference signals from a plurality of transmission and reception points (TRPs) associated with a network entity (e.g., a base station, gNB, CU, DU). In one aspect, the communication and processing circuitry 1640 can provide a means to receive the respective reference signals from the TRPs (e.g., TRPs 704, 706, and 708 of FIG. 7). The respective reference signals may have different latencies or signal delays.

Figure 18:
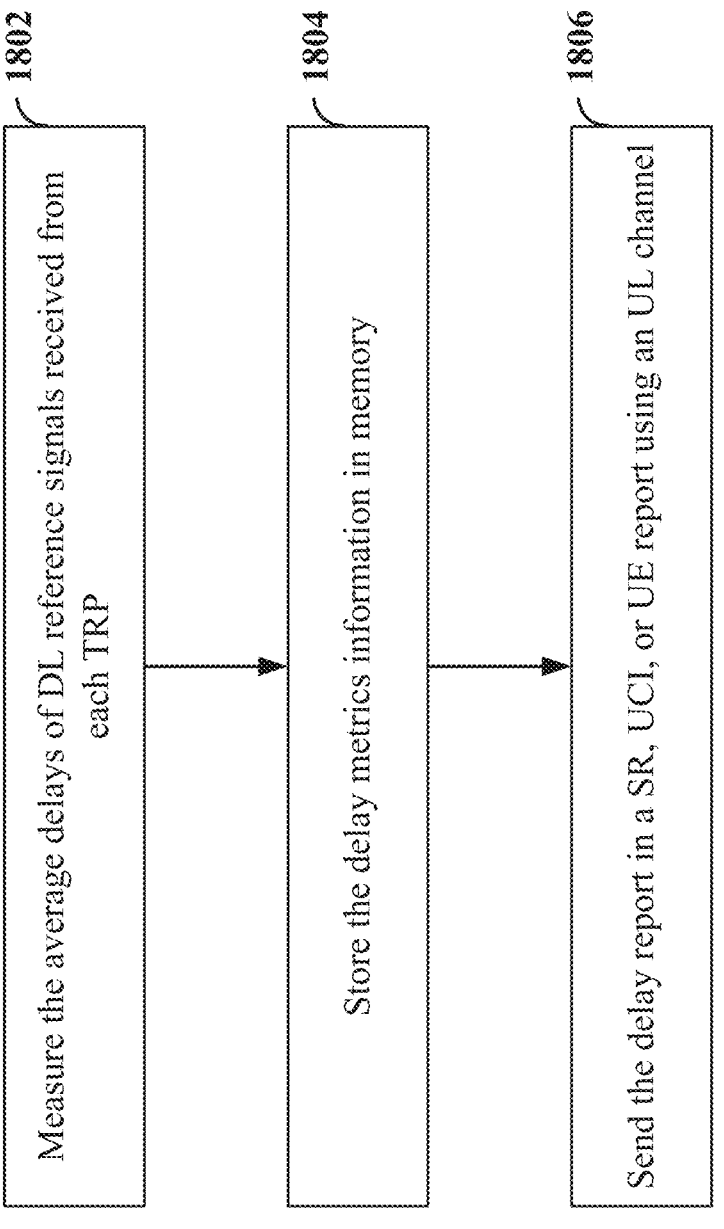
FIG. 18 is a flow chart illustrating a process of providing a delay report according to some aspects.

At block 1704, the UE can send a delay report including delay metrics of the TRPs to the network entity. The communication and processing circuitry 1640 can provide a means to send the delay report to the network entity, for example, using the transceiver 1610 and antenna array 1630. In one example, the delay metrics may include the average delays (e.g., absolute or differential average delays) and/or delay spreads of the TRPs. The delay measurement circuitry 1642 can provide a means to obtain the delay metrics of the TRPs (e.g., TRP1 704, TRP2 706, TRPS 708 of FIG. 7) based on the reference signals received from the TRPs. For example, at 1802 (see FIG. 18), the UE can measure the average delays of DL reference signals (e.g., SSB, CSI-RS, or TRS) received from each TRP. At 1804, the UE can store the delay metrics information in memory (e.g., the memory 1605 and/or computer-readable medium 1606). At 1806, the UE can send or include the delay report in a scheduling request (SR), UCI, or UE report (e.g., CSI report) using an UL channel (e.g., PUCCH, PUSCH). In one example, the delay report or delay metrics may include absolute average delays or differential average delays of the TRPs. A differential average delay can indicate a delay difference between two of the plurality of TRPs.

At block 1706, the UE can receive a plurality of MIMO transmissions from the plurality of TRPs. One or more of the MIMO transmissions can be delay pre-compensated (e.g., advanced or delayed) to reduce the latency or timing differences between the MIMO transmissions based on the delay metrics. The communication and processing circuitry 1440 can provide a means to receive the plurality of MIMO transmissions. In some aspects, the UE can receive a delay pre-compensation indication (e.g., DL delay pre-compensation indication 1108) from the network entity. The delay pre-compensation indication can indicate the one or more MIMO transmissions that are delay pre-compensated (e.g., advanced or delayed). In one example, the UE can store the delay pre-compensation information 1634 in the memory 1605. In one example, the delay pre-compensation indication can indicate a TCI state for each delay pre-compensated MIMO transmission. The UE can determine the average delay and/or delay spread of the MIMO transmissions.

In one configuration, the apparatus 1600 for wireless communication includes means for using delay pre-compensation in a distributed MIMO system. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 3, 6, 7, 10, and/or 11, and utilizing, for example, the processes and/or algorithms described herein in relation to FIGS. 6-11, 17, and/or 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

In a first aspect, a method for wireless communication at a user equipment (UE) in a wireless communication network is provided. The method comprises: receiving respective reference signals from a plurality of transmission and reception points (TRPs) associated with a network entity; sending a delay report to the network entity, the delay report comprising delay metrics obtained based on the reference signals; and receiving a plurality of multiple-in-multiple-out (MIMO) transmissions from the plurality of TRPs, one or more of the MIMO transmissions being delay pre-compensated based on the delay metrics.

In a second aspect, alone or in combination with the first aspect, wherein the delay metrics comprise an average delay for each of the plurality of TRPs based on delay measurements of the respective reference signals.

In a third aspect, alone or in combination with the first aspect, wherein the delay metrics comprise a plurality of average delays respectively corresponding to the plurality of TRPs.

In a fourth aspect, alone or in combination with the first aspect, wherein the delay metrics comprise a plurality of differential average delays, each differential average delay indicating a delay difference between two of the plurality of TRPs.

In a fifth aspect, alone or in combination with any of the first to fourth aspects, wherein receiving the plurality of MIMO transmissions comprises: receiving a first MIMO transmission from a first TRP of the plurality TRPs; receiving a second MIMO transmission from a second TRP of the plurality of TRPs; and receiving a third MIMO transmission from a third TRP of the plurality of TRPs, wherein a timing of the first MIMO transmission is advanced relative to the third MIMO transmission, and a timing of the second MIMO transmission is delayed relative to the third MIMO transmission.

In a sixth aspect, alone or in combination with any of the first to fourth aspects, the method further comprises receiving a delay pre-compensation indication indicating the one or more of the MIMO transmissions being delay pre-compensated.

In a seventh aspect, alone or in combination with the sixth aspect, wherein the delay pre-compensation indication further indicates one or more TCI states for receiving the one or more delay pre-compensated MIMO transmissions. In one aspect, the UE ignores an average delay or a delay spread of the one or more TCI states.

In an eighth aspect, alone or in combination with any of the first to fourth aspects, wherein the receiving the plurality of MIMO transmissions comprises at least one of: receiving a delay pre-compensated reference signal from one or more of the plurality of TRPs; or receiving a delay pre-compensated downlink channel transmission from one or more of the plurality of TRPs.

In a ninth aspect, alone or in combination with any of the first to fourth aspects, the method further comprises receiving control information from the network entity, the control information configuring the UE to report the delay metrics of the plurality of TRPs.

In a tenth aspect, alone or in combination with the ninth aspect, wherein the control information indicates the UE to report the delay metrics comprising absolute or differential average delays of the plurality of TRPs.

In an eleventh aspect, a user equipment (UE) for a wireless communication network is provided, the UE comprises: a memory stored with instructions for wireless communication; and a processor coupled to the memory, wherein the processor is configured by the instructions to: receive respective reference signals from a plurality of transmission and reception points (TRPs); send a delay report to a network entity, the delay report comprising delay metrics obtained based on the reference signals; and receive a plurality of multiple-in-multiple-out (MIMO) transmissions from the plurality of TRPs, one or more of the MIMO transmissions being delay pre-compensated based on the delay metrics.

In a twelfth aspect, alone or in combination with the eleventh aspect, wherein the delay metrics comprise an average delay for each of the plurality of TRPs based on delay measurements of the respective reference signals.

In a thirteenth aspect, alone or in combination with the eleventh aspect, wherein the delay metrics comprise a plurality of average delays respectively corresponding to the plurality of TRPs.

In a fourteenth aspect, alone or in combination with the eleventh, wherein the delay metrics comprise a plurality of differential average delays, each differential average delay indicating a delay difference between two of the plurality of TRPs.

In a fifteenth aspect, alone or in combination with any of the eleventh to fourteenth aspects, wherein, to receive the plurality of MIMO transmissions, the processor is further configured to: receive a first MIMO transmission from a first TRP of the plurality TRPs; receive a second MIMO transmission from a second TRP of the plurality of TRPs; and receive a third MIMO transmission from a third TRP of the plurality of TRPs, wherein a timing of the first MIMO transmission is advanced relative to the third MIMO transmission, and a timing of the second MIMO transmission is delayed relative to the third MIMO transmission.

In a sixteenth aspect, alone or in combination with any of the eleventh to fourteenth aspects, wherein the processor is further configured to receive a delay pre-compensation indication indicating the one or more of the MIMO transmissions being delay pre-compensated.

In a seventeenth aspect, alone or in combination with the sixteenth aspect, wherein the delay pre-compensation indication further indicates one or more TCI states for receiving the one or more delay pre-compensated MIMO transmissions. In one aspect, the processor is further configured to ignore an average delay or a delay spread of the one or more TCI states.

In an eighteenth aspect, alone or in combination with any of the eleventh to fourteenth aspects, wherein, to receive the plurality of MIMO transmissions, the processor is further configured to at least one of: receive a delay pre-compensated reference signal from one or more of the plurality of TRPs; or receive a delay pre-compensated downlink channel transmission from one or more of the plurality of TRPs.

In a nineteenth aspect, alone or in combination with any of the eleventh to fourteenth aspects, wherein the processor is further configured to receive control information from the network entity, the control information configuring the UE to report the delay metrics of the plurality of TRPs.

In a twentieth aspect, alone or in combination with the nineteenth aspect, wherein the control information indicates the UE to report the delay metrics comprising absolute or differential average delays of the plurality of TRPs.

In a twenty-first aspect, a method for wireless communication at a network entity in a wireless communication network is provided. The method comprises: receiving a delay report comprising delay metrics of a plurality of transmission and reception points (TRPs) associated with the network entity; and providing a plurality of multiple-in-multiple-out (MIMO) transmissions via the plurality of TRPs, one or more of the MIMO transmissions being delay pre-compensated based on the delay metrics.

In a twenty-second aspect, alone or in combination with the twenty-first aspect, wherein the delay metrics comprise a plurality of average delays respectively corresponding to the plurality of TRPs.

In a twenty-third aspect, alone or in combination with the twenty-first aspect, wherein the delay metrics comprise a plurality of differential average delays, each differential average delay indicating a delay difference between two of the plurality of TRPs.

In a twenty-fourth aspect, alone or in combination with any of the twenty-first to twenty-third aspects, wherein the providing the plurality of MIMO transmissions comprises: providing a first MIMO transmission of the plurality of MIMO transmissions using a first TRP of the plurality of TRPs; providing a second MIMO transmission of the plurality of MIMO transmissions using a second TRP of the plurality of TRPs; and providing a third MIMO transmission of the plurality of MIMO transmissions using a third TRP of the plurality of TRPs, wherein a timing of the first MIMO transmission is advanced relative to the third MIMO transmission, and a timing of the second MIMO transmission is delayed relative to the third MIMO transmission.

In a twenty-fifth aspect, alone or in combination with any of the twenty-first to twenty-third aspects, the method comprises: sending a delay pre-compensation indication to indicate the one or more of the MIMO transmissions being delay pre-compensated.

In a twenty-sixth aspect, alone or in combination with the twenty-fifth aspect, wherein the delay pre-compensation indication indicates one or more transmission configuration indicator (TCI) states for receiving the one or more delay pre-compensated MIMO transmissions.

In a twenty-seventh aspect, alone or in combination with any of the twenty-first to twenty-third aspects, wherein the providing the plurality of MIMO transmissions comprises at least one of: transmitting a delay pre-compensated reference signal from one or more of the plurality of TRPs; or transmitting a delay pre-compensated downlink channel transmission from one or more of the plurality of TRPs.

In a twenty-eighth aspect, alone or in combination with any of the twenty-first to twenty-third aspects, the method further comprises sending control information to a user equipment (UE), the control information requesting the UE to report the delay metrics of the plurality of TRPs.

In a twenty-ninth aspect, alone or in combination with the twenty-eighth aspect, wherein the control information requests the UE to report the delay metrics comprising absolute or differential average delays of the plurality of TRPs.

In a thirtieth aspect, a network entity for wireless communication is provided. The network entity comprises: a memory stored with instructions for wireless communication; and a processor coupled to the memory, wherein the processor is configured by the instructions to: receive a delay report comprising delay metrics of a plurality of transmission and reception points (TRPs) associated with the network entity; and provide a plurality of multiple-in-multiple-out (MIMO) transmissions via the plurality of TRPs, one or more of the MIMO transmissions being delay pre-compensated based on the delay metrics.

In a thirtieth-first aspect, alone or in combination with the thirtieth aspect, wherein the delay metrics comprise a plurality of average delays respectively corresponding to the plurality of TRPs.

In a thirtieth-second aspect, alone or in combination with the thirtieth aspect, wherein the delay metrics comprise a plurality of differential average delays, each differential average delay indicating a delay difference between two of the plurality of TRPs.

In a thirtieth-third aspect, alone or in combination with any of the thirtieth to thirtieth-second aspects, wherein, to provide the plurality of MIMO transmissions, the processor is further configured to: provide a first MIMO transmission of the plurality of MIMO transmissions using a first TRP of the plurality of TRPs; provide a second MIMO transmission of the plurality of MIMO transmissions using a second TRP of the plurality of TRPs; and provide a third MIMO transmission of the plurality of MIMO transmissions using a third TRP of the plurality of TRPs, wherein a timing of the first MIMO transmission is advanced relative to the third MIMO transmission, and a timing of the second MIMO transmission is delayed relative to the third MIMO transmission.

In a thirtieth-fourth aspect, alone or in combination with any of the thirtieth to thirtieth-second aspects, wherein the processor is further configured to send a delay pre-compensation indication to indicate the one or more of the MIMO transmissions being delay pre-compensated.

In a thirtieth-fifth aspect, alone or in combination with the thirtieth-fourth aspect, wherein the delay pre-compensation indication indicates one or more transmission configuration indicator (TCI) states for receiving the one or more delay pre-compensated MIMO transmissions.

In a thirtieth-sixth aspect, alone or in combination with any of the thirtieth to thirtieth-second aspects, wherein, to transmit the plurality of MIMO transmissions, the processor is further configured to at least one of: transmit a delay pre-compensated reference signal from one or more of the plurality of TRPs; or transmit a delay pre-compensated downlink channel transmission from one or more of the plurality of TRPs.

In a thirtieth-seventh aspect, alone or in combination with any of the thirtieth to thirtieth-second aspects, wherein the processor is further configured to send control information to a user equipment (UE), the control information requesting the UE to report the delay metrics of the plurality of TRPs.

In a thirtieth-eighth aspect, alone or in combination with the thirtieth-seventh aspect, wherein the control information requests the UE to report the delay metrics comprising absolute or differential average delays of the plurality of TRPs.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a user equipment (UE), the method comprising:

receiving respective reference signals from a plurality of transmission and reception points (TRPs) associated with a network entity;

sending a delay report to the network entity, the delay report comprising delay metrics based on the reference signals, the delay metrics configured to indicate a delay spread associated with each of the reference signals; and receiving a plurality of multiple-in-multiple-out (MIMO) transmissions from the plurality of TRPs, one or more of the MIMO transmissions being delay pre-compensated to reduce a delay difference between the MIMO transmissions based on the delay metrics.

2. The method of claim 1, wherein the delay metrics comprise an average delay for each of the plurality of TRPs based on delay measurements of the respective reference signals.

3. The method of claim 1, wherein the delay metrics comprise a plurality of differential average delays, each differential average delay indicating a delay difference between two of the plurality of TRPs.

4. The method of claim 1, wherein receiving the plurality of MIMO transmissions comprises:

receiving a first MIMO transmission from a first TRP of the plurality of TRPs;

receiving a second MIMO transmission from a second TRP of the plurality of TRPs; and receiving a third MIMO transmission from a third TRP of the plurality of TRPs, wherein a timing of the first MIMO transmission is advanced relative to the third MIMO transmission based on the delay metrics, and a timing of the second MIMO transmission is delayed relative to the third MIMO transmission based on the delay metrics.

5. The method of claim 1, further comprising:

receiving a delay pre-compensation indication indicating the one or more of the MIMO transmissions being delay pre-compensated, wherein the delay pre-compensation indication further indicates one or more transmission configuration indicator (TCI) states for receiving the one or more MIMO transmissions being delay pre-compensated.

6. The method of claim 1, wherein the receiving the plurality of MIMO transmissions comprises at least one of:

receiving a delay pre-compensated reference signal from one or more of the plurality of TRPs; or receiving a delay pre-compensated downlink channel transmission from one or more of the plurality of TRPs.

7. The method of claim 1, further comprising:

receiving control information from the network entity, the control information configuring the UE to report the delay metrics of the plurality of TRPs, wherein the control information indicates the UE to report the delay metrics comprising absolute or differential average delays of the plurality of TRPs.

8. A user equipment (UE) for a wireless communication network, the UE comprising:

a memory stored with instructions for wireless communication; and one or more processors coupled to the memory, wherein the one or more processors are configured by the instructions to:

receive respective reference signals from a plurality of transmission and reception points (TRPs);

send a delay report to a network entity, the delay report comprising delay metrics based on the reference signals, the delay metrics configured to indicate a delay spread associated with each of the reference signals; and receive a plurality of multiple-in-multiple-out (MIMO) transmissions from the plurality of TRPs, one or more of the MIMO transmissions being delay pre-compensated to reduce a delay difference between the MIMO transmissions based on the delay metrics.

9. The UE of claim 8, wherein the delay metrics comprise an average delay for each of the plurality of TRPs based on delay measurements of the respective reference signals.

10. The UE of claim 8, wherein the delay metrics comprise a plurality of differential average delays, each differential average delay indicating a delay difference between two of the plurality of TRPs.

11. The UE of claim 8, wherein, to receive the plurality of MIMO transmissions, the one or more processors are further configured to:

receive a first MIMO transmission from a first TRP of the plurality of TRPs;

receive a second MIMO transmission from a second TRP of the plurality of TRPs; and receive a third MIMO transmission from a third TRP of the plurality of TRPs, wherein a timing of the first MIMO transmission is advanced relative to the third MIMO transmission based on the delay metrics, and a timing of the second MIMO transmission is delayed relative to the third MIMO transmission based on the delay metrics.

12. The UE of claim 8, wherein the one or more processors are further configured to:

receive a delay pre-compensation indication indicating the one or more of the MIMO transmissions being delay pre-compensated.

13. The UE of claim 12, wherein the delay pre-compensation indication further indicates a TCI state for receiving the one or more MIMO transmissions being delay pre-compensated.

14. The UE of claim 13, wherein the one or more processors are further configured to:

ignore an average delay or a delay spread of the one or more TCI states for receiving the one or more delay pre-compensated MIMO transmissions.

15. The UE of claim 8, wherein, to receive the plurality of MIMO transmissions, the one or more processors are further configured to at least one of:

receive a delay pre-compensated reference signal from one or more of the plurality of TRPs; or receive a delay pre-compensated downlink channel transmission from one or more of the plurality of TRPs.

16. The UE of claim 8, wherein the one or more processors are further configured to:

receive control information from the network entity, the control information configuring the UE to report the delay metrics of the plurality of TRPs, wherein the control information indicates the UE to report the delay metrics comprising absolute or differential average delays of the plurality of TRPs.

17. A method for wireless communication at a network entity in a wireless communication network, the method comprising:

receiving a delay report comprising delay metrics of a plurality of transmission and reception points (TRPs) associated with the network entity, the delay metrics configured to indicate a delay spread associated with each of the plurality of TRPs; and providing a plurality of multiple-in-multiple-out (MIMO) transmissions via the plurality of TRPs, one or more of the MIMO transmissions being delay pre-compensated to reduce a delay difference between the MIMO transmissions based on the delay metrics.

18. The method of claim 17, wherein the delay metrics comprise a plurality of average delays respectively corresponding to the plurality of TRPs; or wherein the delay metrics comprise a plurality of differential average delays, each differential average delay indicating a delay difference between two of the plurality of TRPs.

19. The method of claim 17, wherein the providing the plurality of MIMO transmissions comprises:

providing a first MIMO transmission of the plurality of MIMO transmissions using a first TRP of the plurality of TRPs;

providing a second MIMO transmission of the plurality of MIMO transmissions using a second TRP of the plurality of TRPs; and providing a third MIMO transmission of the plurality of MIMO transmissions using a third TRP of the plurality of TRPs, wherein a timing of the first MIMO transmission is advanced relative to the third MIMO transmission based on the delay metrics, and a timing of the second MIMO transmission is delayed relative to the third MIMO transmission based on the delay metrics.

20. The method of claim 17, further comprising:

sending a delay pre-compensation indication to indicate the one or more of the MIMO transmissions being delay pre-compensated, wherein the delay pre-compensation indication indicates one or more transmission configuration indicator (TCI) states for receiving the one or more MIMO transmissions being delay pre-compensated.

21. The method of claim 17, wherein the providing the plurality of MIMO transmissions comprises at least one of:

transmitting a delay pre-compensated reference signal from one or more of the plurality of TRPs; or transmitting a delay pre-compensated downlink channel transmission from one or more of the plurality of TRPs.

22. The method of claim 17, further comprising:

sending control information to a user equipment (UE), the control information requesting the UE to report the delay metrics of the plurality of TRPs, wherein the control information requests the UE to report the delay metrics comprising absolute or differential average delays of the plurality of TRPs.

23. A network entity for wireless communication, the network entity comprising:

a memory stored with instructions for wireless communication; and one or more processors coupled to the memory, wherein the one or more processors are configured by the instructions to:

receive a delay report comprising delay metrics of a plurality of transmission and reception points (TRPs) associated with the network entity, the delay metrics configured to indicate a delay spread associated with each of the plurality of TRPs; and provide a plurality of multiple-in-multiple-out (MIMO) transmissions via the plurality of TRPs, one or more of the MIMO transmissions being delay pre-compensated to reduce a delay difference between the MIMO transmissions based on the delay metrics.

24. The network entity of claim 23, wherein the delay metrics comprise a plurality of average delays respectively corresponding to the plurality of TRPs.

25. The network entity of claim 23, wherein the delay metrics comprise a plurality of differential average delays, each differential average delay indicating a delay difference between two of the plurality of TRPs.

26. The network entity of claim 23, wherein, to provide the plurality of MIMO transmissions, the one or more processors are further configured to:

provide a first MIMO transmission of the plurality of MIMO transmissions using a first TRP of the plurality of TRPs;

provide a second MIMO transmission of the plurality of MIMO transmissions using a second TRP of the plurality of TRPs; and provide a third MIMO transmission of the plurality of MIMO transmissions using a third TRP of the plurality of TRPs, wherein a timing of the first MIMO transmission is advanced relative to the third MIMO transmission based on the delay metrics, and a timing of the second MIMO transmission is delayed relative to the third MIMO transmission based on the delay metrics.

27. The network entity of claim 23, wherein the one or more processors are further configured to:

send a delay pre-compensation indication to indicate the one or more of the MIMO transmissions being delay pre-compensated.

28. The network entity of claim 27, wherein the delay pre-compensation indication indicates a transmission configuration indicator (TCI) state for receiving the one or more MIMO transmissions being delay pre-compensated.

29. The network entity of claim 23, wherein, to transmit the plurality of MIMO transmissions, the one or more processors are further configured to at least one of:

transmit a delay pre-compensated reference signal from one or more of the plurality of TRPs; or transmit a delay pre-compensated downlink channel transmission from one or more of the plurality of TRPs.

30. The network entity of claim 23, wherein the one or more processors are further configured to:

send control information to a user equipment (UE), the control information requesting the UE to report the delay metrics of the plurality of TRPs, wherein the control information requests the UE to report the delay metrics comprising absolute or differential average delays of the plurality of TRPs.

* * * * *